(12) United States Patent  
Tashman et al.

(10) Patent No.: US 12,530,605 B2  
(45) Date of Patent: Jan. 20, 2026

(54) SYSTEM FOR PROBABILISTIC REASONING AND DECISION MAKING ON DIGITAL TWINS

(71) Applicant: Accenture Global Solutions Limited, Dublin (IE)

(72) Inventors: Zaid Tashman, San Francisco, CA (US); Matthew Kujawinski, San Jose, CA (US); Neda Abolhassani, San Mateo, CA (US); Sanjoy Paul, Sugar Land, TX (US); Thien Quang Nguyen, San Jose, CA (US); Eric Annong Tang, Fremont, CA (US); Jessica Huey-Jen Yeh, Sunnyvale, CA (US)

(73) Assignee: Accenture Global Solutions Limited, Dublin (IE)

( * ) Notice: Subject to any disclaimer, the term of this patent is extended or adjusted under 35 U.S.C. 154(b) by 1002 days.

(21) Appl. No.: 17/681,699

(22) Filed: Feb. 25, 2022

(65) Prior Publication Data

US 2023/0274170 A1    Aug. 31, 2023

(51) Int. Cl.
*G06N 7/01* (2023.01)
*G06N 3/008* (2023.01)
*G06N 5/02* (2023.01)
*G06N 5/022* (2023.01)
*G06N 7/06* (2006.01)

(52) U.S. Cl.
CPC ............... *G06N 7/01* (2023.01); *G06N 3/008* (2013.01); *G06N 5/02* (2013.01); *G06N 5/022* (2013.01); *G06N 7/06* (2013.01)

(58) Field of Classification Search
CPC ............ G06N 7/01; G06N 3/008; G06N 5/02; G06N 5/022; G06N 7/06
See application file for complete search history.

(56) References Cited

U.S. PATENT DOCUMENTS

| | | |
|---|---|---|
| 2018/0137424 A1 | 5/2018 | Gabaldon Royval et al. |
| 2020/0134639 A1* | 4/2020 | Canedo ................. G06Q 10/00 |

OTHER PUBLICATIONS

Eric, "Beginner's Guide To Maximum Likelihood Estimation", Sep. 23, 2020, APTech, https://www.aptech.com/blog/beginners-guide-to-maximum-likelihood-estimation-in-gauss/ (Year: 2020).*

(Continued)

*Primary Examiner* — Miranda M Huang  
(74) *Attorney, Agent, or Firm* — Seed Intellectual Property Law Group LLP

(57) ABSTRACT

Aspects of the present disclosure provide systems, methods, and computer-readable storage media that support ontology driven processes to create digital twins that extend the capabilities of knowledge graphs. A dataset including an ontology and domain data corresponding to a domain associated with the ontology is obtained. A knowledge graph is constructed based on the ontology and the domain data is incorporated into the knowledge graph. The knowledge graph is exploited to derive random variables of a probabilistic graph model. The random variables may be associated with probability distributions, which may include unknown parameters. A learning process is executed to learn the unknown parameters and obtain a joint distribution of the probabilistic graph model, which may enable querying of the probabilistic graph model in a probabilistic and deterministic manner.

19 Claims, 23 Drawing Sheets

(56) References Cited

OTHER PUBLICATIONS

Toyosi Ademujimi and Vittaldas Prabhu, "Digital Twin for Training Bayesian Networks for Fault Diagnostics of Manufacturing Systems", referenced herein as Prabhu, published Feb. 13, 2022, Digital Twins, Sensing Technologies and Automation in Industry 4.0, https://doi.org/10.3390/s22041430 (Year: 2022).*

Ademujimi, T. et al., "Digital Twin for Training Bayesian Networks for Fault Diagnostics of Manufacturing Systems," Sensors, vol. 22, No. 4, Feb. 2022, 24 pages.

European Patent Office, Communication, Extended European Search Report issued for European Patent Application No. 23155936.0, dated Jun. 28, 2023, 9 pages.

Freedman, H. et al., "Ontology Modeling for Probabilistic Knowledge Graphs," IEEE 17th International Conference on Semantic Computing (ICSC), Feb. 2023, 8 pages.

Matsumoto, S., "PR-OWL Decision: A Framework for Decision Making with Probabilistic Ontologies," [Doctor of Philosophy, George Mason University] ProQuest Dissertations Publishing, 2019, ProQuest No. 13864553, 200 pages.

Matsumoto, S. et al., "PR-OWL Decision: Toward Reusable Ontology Language for Decision Making under Uncertainty," Conference: Semantic Technology For Intelligence, Defense, And Security, George Mason University, Fairfax, Virginia, Nov. 2016, 9 pages.

\* cited by examiner

220

| Robot | Manufacturer | Age | Task | Duration | Status |
|---|---|---|---|---|---|
| high-speed | Yaskawa | - | - | 2.11814939 | success |
| - | - | 3 | uneven-pick | 15.6752406 | success |
| ultra-maneuv. | Fetch | 6 | - | 8.80341791 | success |
| high-payload | Fetch | 7 | uneven-pick | 13.7577873 | failure |
| ext.-reach | Yaskawa | 9 | rect.-pick | 3.96026499 | success |
| ext.-reach | Yaskawa | 4 | round-pick | - | success |
| high-payload | - | 4 | uneven-pick | 15.26282063 | failure |
| high-speed | Yaskawa | 5 | uneven-pick | 4.0892153 | failure |
| dual-arm | Fetch | 3 | uneven-pick | 14.8711406 | success |
| ... | ... | ... | ... | ... | ... |

$$P(D | R = dualarm, T = softpick)$$

SYSTEM FOR PROBABILISTIC REASONING AND DECISION MAKING ON DIGITAL TWINS

TECHNICAL FIELD

The present disclosure relates generally to system modelling and more specifically to techniques for extending capabilities of digital twins using probabilistic reasoning.

BACKGROUND

Presently, entities across many different industries are seeking to incorporate the use of digital twins to test, streamline, or otherwise evaluate various aspects of their operations. One such industry is the automotive industry, where digital twins has been explored as a means to analyze and evaluate performance of a vehicle. To illustrate, the use of digital twins has been explored as a means to safely evaluate performance of autonomous vehicles in mixed driver environments (i.e., environments where autonomous vehicles are operating in the vicinity of human drivers). As can be appreciated from the non-limiting example above, the ability to analyze performance or other factors using a digital twin, rather than its real world counterpart (e.g., the vehicle represented by the digital twin), can provide significant advantages. Although the use of digital twins has proved useful across many different industries, much of the current interest is focused only on the benefits that may be realized by using digital twins, and other challenges have gone unaddressed.

One particular challenge that remains with respect to the use of digital twins is the creation of the digital twins themselves. For example, tools currently exist to aid in the creation of digital twins, but most existing tools are limited in the sense that they may be suitable for a specific use case (e.g., creating a digital twin of a physical space, such as a building) but not suitable for another use case (e.g., creating a digital twin of a process). As a result, an entity may need to utilize multiple tools to develop digital twins covering different portions of the use case of interest. In such instances it is sometimes the case that digital twins created using different tools are not compatible with each other, thereby limiting the types of analysis and insights that may be obtained using the digital twins. Additionally, some digital twin creation tools are not well-suited with respect to addressing changes to the real world counterpart and may require re-designing and rebuilding the digital twin each time changes to the real world counterpart occur. This can be particularly problematic for uses cases involving industries where changes frequently occur, such as the manufacturing industry. Thus, while digital twins have shown promise as a means to evaluate their real world counterparts, the above-described drawbacks have limited the benefits that may be realized.

SUMMARY

Aspects of the present disclosure provide systems, methods, and computer-readable storage media that support ontology driven processes to define and create digital twins that extend the capabilities of knowledge graphs with respect to inferencing, prediction, and decision making. The disclosed systems and methods compile data from one or more data sources and leverage a set of tools or functionality to transform the compiled data into a format that is ready to incorporate into a knowledge graph while meeting the structural constraints defined in the ontology. For example, the compiled data may include observations from entities defined in the ontology representing a domain (e.g., an entity, process, machine, system, etc.). The ontology provides an explicit specification of concepts, properties, and relationships between different objects within the domain. In addition to the ontology, the compiled data may include other types of information, such as operational data (e.g., if the ontology describes a vehicle, the operational data may include data captured during operation of the vehicle).

A knowledge graph is constructed as a realization of the given domain specific ontology by combining and transforming the compiled data, operational data, and any other external data sources. Once generated, the knowledge graph represents semantic relationships between entities (e.g, nodes) within a business. Information may be inferred from the semantic relationships represented by the knowledge graph, and such information is limited to logical inferences. As such, the knowledge that may be inferred from the knowledge graph is limited to explicit information presented in the graph, such as frequencies, counts, relationships, hierarchies, and the like.

The tools and functionality disclosed herein extend the ability to infer implicit and sometimes hidden knowledge from a knowledge graph by transforming the knowledge graph into a probabilistic graph model. To generate the probabilistic graph model, the knowledge graph may be transformed by treating entities (e.g., nodes) within the graph as random variables, and semantic relationships as statistical dependencies. Each of the random variables may be associated with a probability distribution, but upon initially determining the random variables, one or more parameters of the probability distributions may be unknown. Bayesian learning techniques may be used to learn the unknown parameters or approximations of those parameters from the data of the knowledge graph. Once the unknown parameters have been learned, a joint distribution of the probabilistic graph model may be obtained, which enables queries to be constructed for any combinations of the random variables of the probabilistic graph model.

While the knowledge graph may contain all of the information used to generate the probabilistic graph model, the ability to infer implicit and sometimes hidden knowledge from the knowledge graph is limited since the knowledge graph simply represents semantic relationships and hierarchies. Unlike the knowledge graph, the probabilistic graph model represents information observed from the data directly and information learned using statistical learning techniques conditioned on the graphical structure specified through the statistical dependencies between random variables (i.e., nodes), which enables additional knowledge to be inferred from the data. For example, queries of the probabilistic graph model enable knowledge to be inferred using probabilistic inferences (e.g., whether one subset of the random variables is independent of another subset of random variables, or whether one subset of the random variables is conditionally independent of another subset of random variables given a third subset). The queries may also be used to calculate conditional probabilities, find and fill in missing data, perform optimization for decision making under uncertainty, and other types of capabilities not otherwise available using the knowledge graph alone.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which:

FIG. 2C is a block diagram illustrating an exemplary dataset that may be incorporated into a knowledge graph in accordance with the present disclosure;

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Aspects of the present disclosure provide systems, methods, apparatus, and computer-readable storage media that support ontology driven processes to define and generate probabilistic graph models that extend the capabilities of the digital twins with respect to inferencing, prediction, and decision making. The process of generating a probabilistic graph model leverages semantic relationships defined in a given ontology to construct knowledge graph based digital twins that, while providing limited capabilities for inferring knowledge, can be exploited to produce probabilistic graphs providing robust knowledge inferencing capabilities. For example, the knowledge graph may be used to identify a set of semantic relationships as statistical dependencies that can be used to connect random variables of the probabilistic graph. Each random variable may be associated with a probability distribution and any unknown parameters of the probability distributions can be learned or approximated using data incorporated into the knowledge graph. Once generated, the probabilistic graph enables complex ad-hoc conditional probabilistic queries with uncertainty quantification, which provides a more meaningful and robust ability to infer knowledge (e.g., using a what-if analysis). Additionally, the enhanced inferential knowledge may enable the probabilistic graph to be used to define and solve optimization problems for making decisions.

Figure 1:
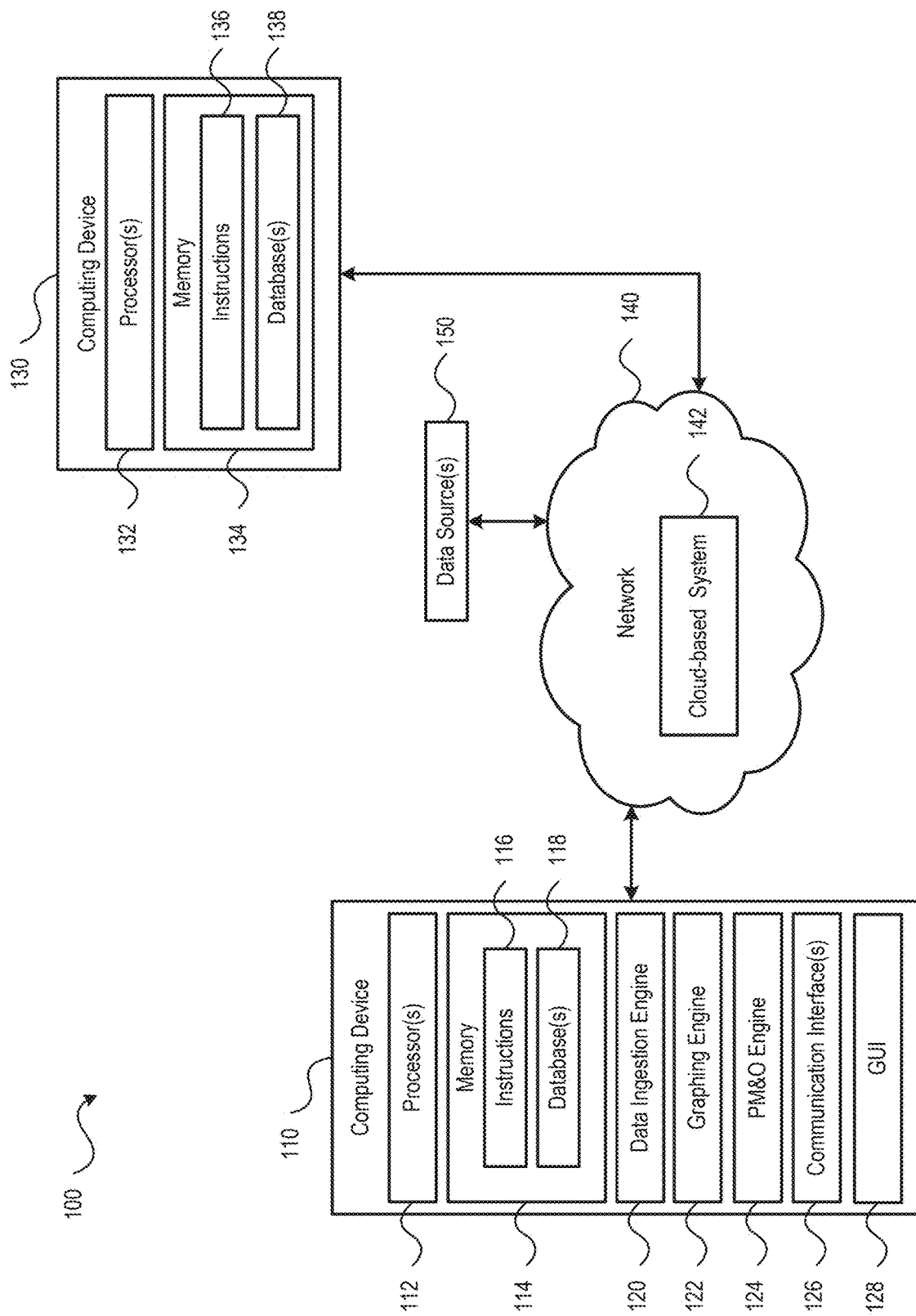
FIG. 1 is a block diagram illustrating an exemplary system that supports generation of digital twins according to one or more aspects of the present disclosure.

Referring to FIG. 1, a block diagram illustrating an exemplary system that supports generation of digital twins according to one or more aspects of the present disclosure is shown as a system 100. As shown in FIG. 1, the system 100 includes a computing device 110, a computing device 130, one or more networks 140, a cloud-based system 142, and one or more data sources 150. The computing device 110 may include or correspond to a desktop computing device, a laptop computing device, a personal computing device, a tablet computing device, a mobile device (e.g., a smart phone, a tablet, a personal digital assistant (PDA), a wearable device, and the like), a server, a virtual reality (VR) device, an augmented reality (AR) device, an extended reality (XR) device, a vehicle (or a component thereof), an entertainment system, other computing devices, or a combination thereof, as non-limiting examples. The computing device 110 includes one or more processors 112, a memory 114, a data ingestion engine 120, a graphing engine 122, a probabilistic modelling and optimization engine 124, and one or more communication interfaces 126. In some implementations the computing device 110 may also provide one or more graphical user interfaces (GUIs) 128 that enable a user to interact with the functionality described in connection with the computing device 110, as described in more detail below and illustrated with reference to FIGS. 9A-9D. In additional or alternative implementations the GUI(s) may be provided by another device of the system 100, such as computing device 130, as described in more detail below. In some other implementations, one or more of the components 120-128 may be optional, one or more of the components 120-128 may be integrated into a single component (e.g., the data ingestion engine 120 and the graphing engine 122 may be combined, etc.), one or more additional components may be included in the computing device 110, or combinations thereof (e.g., some components may be combined into a single component, some components may be omitted, while other components may be added).

It is noted that functionalities described with reference to the computing device 110 are provided for purposes of illustration, rather than by way of limitation and that the exemplary functionalities described herein may be provided via other types of computing resource deployments. For example, in some implementations, computing resources and functionality described in connection with the computing device 110 may be provided in a distributed system using multiple servers or other computing devices, or in a cloud-based system using computing resources and functionality provided by a cloud-based environment that is accessible over a network, such as the one of the one or more networks 140. To illustrate, one or more operations described herein with reference to the computing device 110 may be performed by one or more servers or a cloud-based system 142 that communicates with one or more client or user devices.

The one or more processors 112 may include one or more microcontrollers, application specific integrated circuits (ASICs), field programmable gate arrays (FPGAs), central processing units (CPUs) and/or graphics processing units (GPUs) having one or more processing cores, or other circuitry and logic configured to facilitate the operations of the computing device 110 in accordance with aspects of the present disclosure. The memory 114 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of the computing device 110 may be stored in the memory 114 as instructions 116 that, when executed by the one or more processors 112, cause the one or more processors 112 to perform the operations described herein with respect to the computing device 110, as described in more detail below. Additionally, the memory 114 may be configured to store data and information in one or more databases 118. Illustrative aspects of the types of information that may be stored in the one or more databases 118 are described in more detail below.

The one or more communication interfaces 126 may be configured to communicatively couple the computing device 110 to the one or more networks 140 via wired or wireless communication links established according to one or more communication protocols or standards (e.g., an Ethernet protocol, a transmission control protocol/internet protocol (TCP/IP), an Institute of Electrical and Electronics Engineers (IEEE) 802.11 protocol, an IEEE 802.16 protocol, a 3rd Generation (3G) communication standard, a 4th Generation (4G)/long term evolution (LTE) communication standard, a 5th Generation (5G) communication standard, and the like). In some implementations, the computing device 110 includes one or more input/output (I/O) devices (not shown in FIG. 1) that include one or more display devices, a keyboard, a stylus, one or more touchscreens, a mouse, a trackpad, a microphone, a camera, one or more speakers, haptic feedback devices, or other types of devices that enable a user to receive information from or provide information to the computing device 110. In some implementations, the computing device 110 is coupled to the display device, such as a monitor, a display (e.g., a liquid crystal display (LCD) or the like), a touch screen, a projector, a virtual reality (VR) display, an augmented reality (AR) display, an extended reality (XR) display, or the like. In some other implementations, the display device is included in or integrated in the computing device 110.

The data ingestion engine 120 may be configured to provide functionality for collecting data to support the functionality provided by the computing device 110. For example, the data ingestion engine 120 may provide functionality for obtaining data to support the operations of the computing device 110 from one or more data sources. Exemplary types of data that may be obtained using the data ingestion engine 120 include one or more ontologies, data collected by Internet of Things (IoT) devices, infrastructure data, financial data, mapping data, time series data, SQL data, or other types of data. The data obtained by the data ingestion engine 120 may be stored in the one or more databases 118 and used by the probabilistic modelling and optimization engine 124 to generate probabilistic models that enable observations, simulations, and other types of operations to be performed, as described in more detail below.

The ontologies obtained by the data ingestion engine 120 provide an abstracted representation of an entity that represents or defines concepts, properties, and relationships for the entity using an accepted body of knowledge (e.g., industry accepted terminology and semantics). The ontologies may specify object types and their semantic relationship to other object types via graph format. Exemplary formats in which the ontologies may be obtained by the data ingestion engine 120 include ".owl" and ".ttl," files. As a non-limiting example, an ontology for a manufacturer may indicate the manufacturer has production facilities in one or more geographic locations and include, for each production facility, information representing: a floor plan for the production facility, manufacturing infrastructure present at the production facility (e.g., assembly robots, computing infrastructure, equipment, tools, and the like), locations of the manufacturing infrastructure within the production facility, other types of information, or combinations thereof. It is noted that while the exemplary characteristics of the above-described ontology have been described with reference to a manufacturer domain, the ontologies obtained by the data ingestion engine 120 may include ontologies representative of other types of domains, such as ontologies associated with processes (e.g., manufacturing processes, computing processes, biological processes, chemical processes, etc.), ontologies associated with machinery or equipment (e.g., a vehicle, a computing device or component thereof, circuitry, robots, etc.), ontologies associated with biological systems, and the like. Accordingly, it should be understood that the operations disclosed herein with reference to the computing device 110 may be applied to any industry, process, machine, etc. capable of representation via an ontology.

The mapping file (i.e., function) may be utilized to associate other types of data obtained by the data ingestion engine 120 to particular portions of the ontology or ontologies. This mapping file is necessary when the original ingested data sources do not have a built-in schema. For example, time series data may be associated with execution of a process or operations of machinery represented within the ontology and the mapping function may be utilized to associate these various pieces of data with the relevant classes and properties in the ontology as well as their type (e.g., portions of the ontology corresponding to the process or operations of the machinery), as described in more detail below.

The graphing engine 122 may utilize the object types and semantic relationships specified in the ontology to construct a knowledge graph representative of the information contained within the ontology. Stated another way, an ontology represents the graph structure itself and the knowledge graph represents a realization of the ontology with data. As an illustrative example and referring to FIG. 2A, a block diagram illustrating exemplary aspects of a knowledge graph in accordance with the present disclosure is shown as a knowledge graph 200. The knowledge graph 200 includes nodes 210, 212 connected via an edge 214. The nodes 210, 212 are digital representations of physical assets (e.g., physical locations, devices, machines, processes, etc.) identified in the ontology and different nodes may be associated with different node types based on properties derived from the ontology. To illustrate using the simplified example shown in FIG. 2A, node 210 represents a first node type—a physical location, such as a warehouse or production facility—and node 212 represents a second node type—an asset, such as robot. The edges of the knowledge graphs may be determined based on the ontology and may be used to formalize semantic relationships within the knowledge graph. For example, in FIG. 2A the edge 210 indicates a semantic relationship between the nodes 210, 212, namely, that the robot represented by the node 212 is located at the physical location represented by the node 210, as indicated by the label "hasDevice" associated with the edge 214. It is noted that the edges of the knowledge graph may be defined such that they point from one node to another node (e.g., from node 210 to node 212) or from a node to data, and the particular node an edge points to may be determined based on the semantic relationship information included in the ontology.

In addition to nodes representing assets, other types of nodes may be provided in a knowledge graph, such as nodes representing attributes (e.g., an age of a machine or robot represented in the knowledge graph), processes steps (e.g., tasks performed by a machine or robot represented in the knowledge graph), entities (e.g., a manufacturer of a machine or robot represented in the knowledge graph), or other types of nodes. As described above, these nodes may be connected to other nodes via edges. For example, the knowledge graph 200 could be generated to include a task node (not shown in FIG. 2A) that is connected to the node 212 representing a robot via an edge that points from the node 212 to the task node to indicate that the robot performs the task associated with the task node. Similarly, the knowledge graph 200 could be generated to include an attribute node (not shown in FIG. 2A) that is connected to the node 212 representing a robot via an edge that points from the node 212 to the attribute node to indicate that the robot has the attribute associated with the attribute node. Likewise, the knowledge graph 200 could be generated to include an entity node (not shown in FIG. 2A) that is connected to the node 212 representing a robot via an edge that points from the entity node to the node 212 to indicate that the robot was produced by the entity associated with the entity node.

The knowledge graph may also incorporate other types of data, such as historical data and metadata. To illustrate, node 212 is described in the example above as representing a robot that performs a task. Sensors or other devices may monitor performance of the task by the robot and generate data associated with performance of the task, such as the number of times the task was performed, whether the task was performed successfully or not, a duration of time required for the robot to complete the task, or other types of data. The dataset generated during the monitoring may be stored in the knowledge graph. Additionally, metadata may also be stored in the knowledge graph, for example, the physical location of where a certain data point is stored, and more specifically, which database on which server and what the IP address of the server is. Additional metadata can also include access privileges for certain users to this data which can be for a subset of knowledge graph.

Referring back to FIG. 1, the digital twin represented by the knowledge graph generated by the graphing engine 122 provides a qualitative representation of the ontology. For example, the knowledge graph provides a representation of the real world assets represented by the ontology (e.g., the nodes of the knowledge graph) and semantic relationships between the assets (e.g., the edges of the knowledge graph). At this point, the knowledge graph produced by the graphing engine 122 enables explicit knowledge to be obtained from the knowledge graph using logical inferences. However, the knowledge graph may be extended to enable implicit knowledge to be derived from the data in the knowledge graph using more complex techniques, such as probabilistic querying of the graph by augmenting it with learned statistical relationships between nodes of the knowledge graph.

Figure 2A:
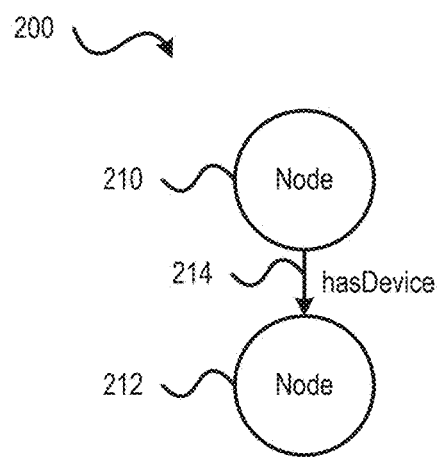
FIG. 2A is a block diagram illustrating exemplary aspects of a knowledge graph in accordance with the present disclosure.
Figure 2B:
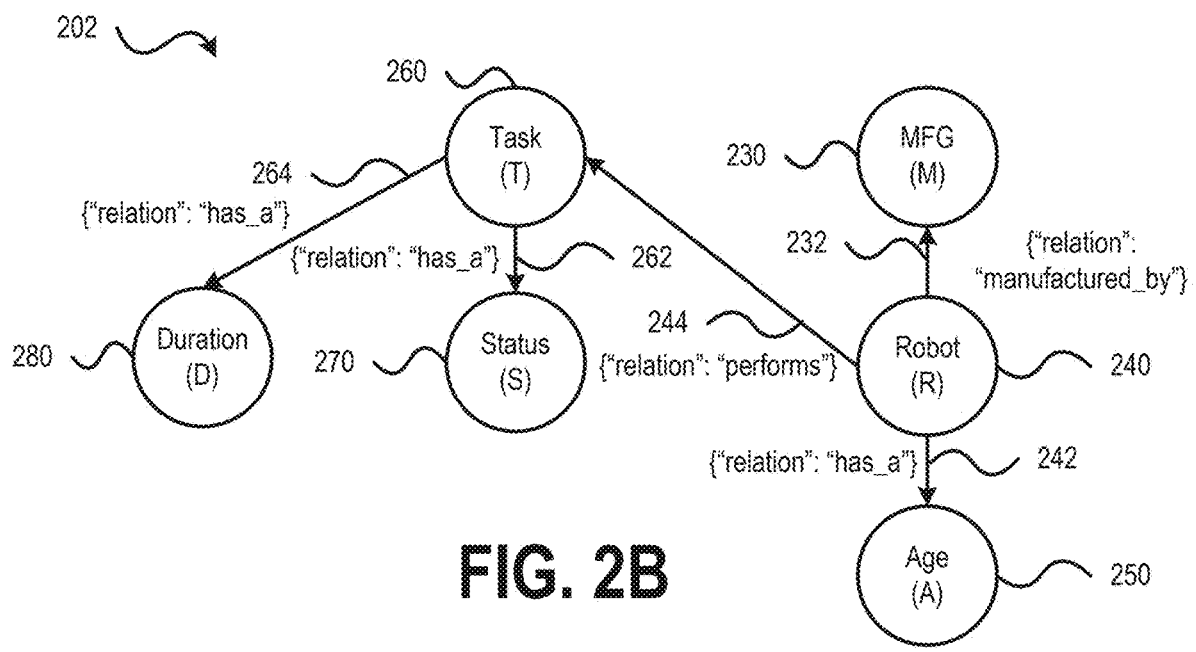
FIG. 2B is a block diagram of a knowledge graph in accordance with the present disclosure.

To illustrate and referring to FIG. 2B, a block diagram of a knowledge graph in accordance with the present disclosure is shown as a knowledge graph 202. As shown in FIG. 2B, the knowledge graph 202 includes nodes 230, 240, 250, 260, 270, 280, where node 230 represents a manufacturer (M), node 240 represents a robot (R), node 250 represents an age (A) (i.e., an attribute), node 260 represents a task (T), node 270 represents a status(S), and node 280 represents a duration (D). The knowledge graph 202 also includes a series of edges 232, 242, 244, 262, 264 that connect different ones of the nodes 230, 240, 250, 260, 270, 280 to indicate semantic relationships among the nodes 230, 240, 250, 260, 270, 280. For example, edge 232 points from the node 240 (i.e., the robot) to the node 230 (i.e., the manufacturer) to indicate the relationship between nodes 230, 240 is the robot was manufactured by the manufacturer. The edge 242 points from node 240 (i.e., the robot) to the node 250 (i.e., the age attribute) to indicate the relationship between nodes 240, 250 is that the robot has an age. The edge 244 points from node 240 (i.e., the robot) to the node 260 (i.e., the task) to indicate the relationship between nodes 240, 250 is that the robot performs the task. The edge 262 points from node 260 (i.e., the task) to the node 270 (i.e., the status) to indicate the relationship between nodes 260, 270 is that the task has a status. Similarly, the edge 264 points from node 260 (i.e., the task) to the node 280 (i.e., the duration) to indicate the relationship between nodes 260, 280 is that the task has a duration.

Referring briefly to FIG. 2C, a block diagram illustrating an exemplary dataset that may be incorporated into a knowledge graph in accordance with the present disclosure is shown as a dataset 220. As shown in FIG. 2C, the dataset 220 may include various types of data associated with performance of tasks by robots corresponding to node 240 of FIG. 2B, where each row represents a different instance of a task being performed. In the dataset 220, column 221 includes information indicating the type of robot that performed the task, column 222 includes information identifying the manufacture of the robot that performed the task, column 223 includes information identifying the age of the robot that performed the task, column 224 identifies the task performed by the robot, column 225 indicates a duration of time (in seconds) to perform the task, and column 226 indicates the status of task execution (e.g., whether the task was completed successfully or not). As described above with reference to FIG. 2A, the exemplary information shown in the dataset 202 may be incorporated into the knowledge graph. Additionally, metadata may also be incorporated into the knowledge graph, where the metadata may identify relationships between the nodes and edges of the knowledge graph and the various pieces of information included in the dataset. For example, the metadata may indicate that the data in column 221 corresponds to the node 240 of the knowledge graph 202 of FIG. 2B, the data in column 222 corresponds to the node 230 of the knowledge graph 202 of FIG. 2B, the data in column 223 corresponds to the node 250 of the knowledge graph 202 of FIG. 2B, the data in column 224 corresponds to the node 260 of the knowledge graph 202 of FIG. 2B, the data in column 225 corresponds to the node 280 of the knowledge graph 202 of FIG. 2B, and the data in column 226 corresponds to the node 270 of the knowledge graph 202 of FIG. 2B. Incorporating the data and metadata into the knowledge graph provides a more complete representation of the domain(s) depicted by the knowledge graph.

Referring back to FIG. 2B, the knowledge graph 202, including the dataset 220 and the metadata described above with reference to FIG. 2C, may be similar to the knowledge graph 200 of FIG. 2A in the sense that the knowledge graph 202 may be used to extract explicit information from the knowledge graph 202 using logical inferences. However, this knowledge that may be derived from the knowledge graph 202 remains somewhat limited. For example, the knowledge graph 202 enables discovery of the fact that two nodes are connected, but does enable extraction or observation of information regarding how those nodes are connected or what the distribution of the relationship between different pairs or sets of nodes is. In accordance with the concepts disclosed herein, the knowledge graph 202 may be extended to support more complex information extraction techniques, such as dependency/independency queries (e.g., are two nodes dependent or independent), conditionally independent queries (e.g., are these two nodes independent despite knowledge of the presence of a 3rd node), and conditional probability queries (e.g., what is the expected duration given a specific type of robot and a particular manufacturer).

Referring back to FIG. 1, the probabilistic modelling and optimization engine 124 may be configured to extend the capabilities of the digital twin represented by knowledge graphs output by the graphing engine 122. As will be described in more detail below, the probabilistic modelling and optimization engine 124 extends the capabilities of a knowledge graphs by leveraging the structure of the knowledge graph and concepts from graph theory and probability theory to produce a probabilistic graph. The probabilistic graph may then be used to obtain additional information and insights via inferences and facilitate learning and complexity assessments. To illustrate, the probabilistic graphs may be used to determine dependencies between nodes, independence of nodes, related conditional independencies, and to learn statistical relationships between nodes. Queries of the probabilistic graph may return distribution over data rather than point estimates. The probabilistic graph model may also be used for simulations. Additional details and examples of the types of information and capability enhancements that may be realized by converting a knowledge graph to a probabilistic graph model in accordance with the concepts disclosed herein are described in more detail below.

To convert the knowledge graph to a probabilistic graph model, the probabilistic modelling and optimization engine 124 generates a model (i.e., the probabilistic graph model) in which the nodes of the knowledge graph are treated as a random variables and edges are treated as statistical dependencies. The conversion of the knowledge graph to a probabilistic graph model may be expressed as:

Let $\mathcal{G}(\mathcal{V}, \mathcal{E})$ represent the knowledge graph, where $\mathcal{V}$ is a set of vertices (i.e., the nodes of the knowledge graph) and $\mathcal{E}$ is a set of edges (i.e., the edges connecting the nodes of the knowledge graph);

Apply f: $\mathcal{V} > \mathcal{M}$ to obtain an acyclic graph $\mathcal{M}(\mathcal{V}', \mathcal{E}')$, where $\mathcal{V}' \subseteq \mathcal{V}$ and $\mathcal{E}'$ are directed edges;

Assume each node $i \in \mathcal{V}'$ is associated with a random variable {A, R, M, T, S, D, ...}, and each edge $(i \rightarrow j) \in \mathcal{E}'$ represents a "statistical dependence."

Figure 3A:
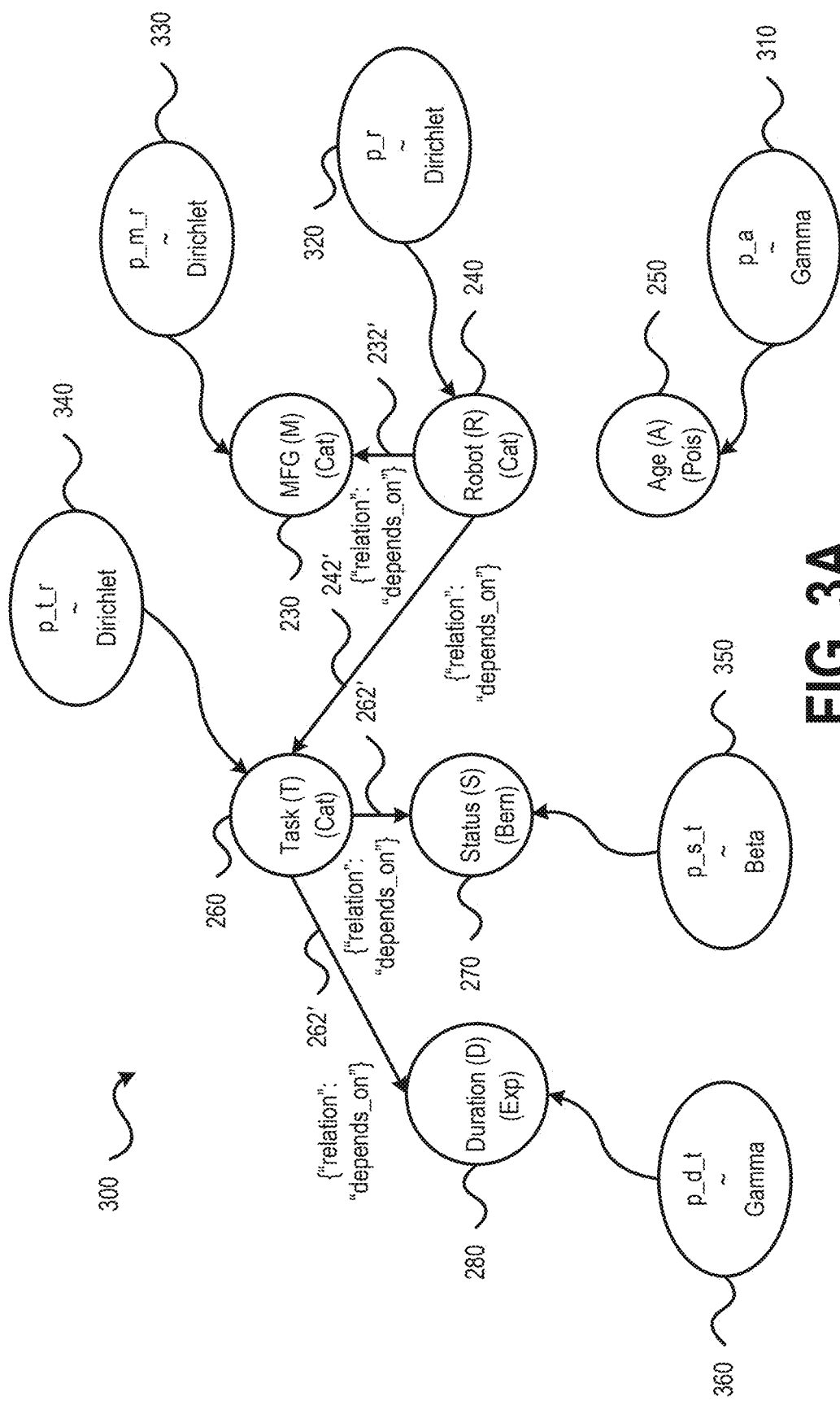
FIG. 3A is a block diagram illustrating a probabilistic graph model according to aspects of the present disclosure.

Each of the random variables represents a probability distribution that describes the possible values that a corresponding random variable can take and a likelihood (or probability) of the random variable taking each possible value. As an illustrative example and referring to FIG. 3A, a block diagram illustrating a probabilistic graph model according to aspects of the present disclosure is shown as a probabilistic graph model 300. The exemplary probabilistic graph model of FIG. 3A represents a probabilistic graph model derived from the knowledge graph 202 of FIG. 2B. For example, the nodes (V') include the nodes 230, 240, 250, 260, 270, 280 of FIG. 2B. The probabilistic graph model 300 includes a set of edges (E') that includes edges 232', 242', 262', and 264'. Unlike the knowledge graph 202 of FIG. 2B, the probabilistic graph model 300 does not include an edge between node 240 and node 250. This is because edges of the knowledge graph 202 of FIG. 2B represent semantic relationships while the edges of the probabilistic graph model 300 represent statistical dependencies. Since the age variable (A) associated with the node 250 is not statistically dependent on the variable (R) (e.g., the node 240), the probabilistic graph model 300 does not include an edge between nodes 240, 250. The statistical dependencies are shown in FIG. 3A as "{'relation': 'depends_on'}" for each of the edges 232', 242', 262', and 264' to illustrate that the variable (R) depends on the variable (M) (e.g., robots may be produced by different manufacturers), the task variable (T) depends on the robot variable (R) (e.g., performance of a particular task depends on the robot since different robots can perform different tasks), and so on.

As explained above, each of the variables {A, R, M, T, S, D, ...} represents a probability distribution. In the example shown FIG. 3A, the age variable (A) represents a probability distribution 310, also noted as P(A), the robot variable (R) represents a probability distribution 320, also noted as P(R), the manufacturer variable (M) represents a probability distribution 330, also noted as P(M|R), the task variable (T) represents a probability distribution 340, also noted as P(T|R), the status variable(S) represents a probability distribution 350, also noted as P(S|T), and the duration variable (I)) represents a probability distribution 360, also noted as P(D|t). Each of the probability distributions 310, 320, 330, 340, 350, 360 may be associated with a set of parameters that characterize the distribution. For example, the set of parameters may include the mean and the variance parameters for a Normal distribution, or the shape and scale parameters for a Gamma distribution, to name a few. As illustrated in FIG. 3A, the probability distribution 310 is associated with the node 250 (i.e., the age variable (A)) and has a Poisson distribution type, the probability distribution 320 is associated with the node 240 (i.e., the robot variable (R)) and has a Categorical distribution type, the probability distribution 330 is associated with the node 230 (i.e., the manufacturer variable (M)) and has a Categorical distribution type, the probability distribution 340 is associated with the node 260 (i.e., the task variable (T)) and has a Categorical distribution type, the probability distribution 350 is associated with the node 270 (i.e., the status variable(S)) and has a Bernoulli distribution type, and the probability distribution 360 is associated with the node 280 (i.e., the duration variable (D))) and has an Exponential distribution type.

The particular distribution type for each of the distributions 310, 320, 330, 340, 350, 360 may be configured by a user, such as a domain expert, and specified directly in the ontology. The user may configure the distribution type based on expected or known characteristics of the probability distributions represented by each random variable. For example, in probability theory Poisson distributions express the probability of a given number of discrete events occurring in a fixed interval of time or space independent of the time since the last event. Since the age of a robot is observed in the data as a discrete integer value (i.e., in years), the user may associate the Poisson distribution type with the age parameter (A). As another example, Categorical distributions describe the possible results of a random variable that can take on one of K possible categories. The user may associate the categorical distribution type to the variables M, R, T since the probabilistic graph model may represent an environment (e.g., the environment defined in the ontology from which the knowledge graph was generated) where many different types of robots are present, each type of robot manufactured by a particular manufacturer and capable of performing a defined set of tasks, all of which define a set of K possible categories for M, R, T, respectively (i.e., a set of K manufacturer categories, a set of K robot categories, and a set of K task categories). Similarly, a Bernoulli distribution represents the discrete probability of a random variable which takes on the value of 1 with probability p and the value of 0 with probability q=1−p (i.e., success or failure). Since the status variable (S) indicates whether the task was performed successfully or failed, the user may associate the Bernoulli distribution type with the status variable (S). The user may assign the exponential distribution type to the duration parameter (D), which represents the amount of time taken to perform a task, because exponential distributions represent the probability distribution of the time between events. It is noted that the exemplary variables, probability distributions, and distribution types described above have been provided for purposes of illustration, rather than by way of limitation and that probabilistic graph models generated in accordance with the present disclosure may utilize other distributions, distribution types, and variables depending on the particular real world counterparts being represented by the probabilistic graph model.

Referring back to FIG. 1, converting the knowledge graph into a probabilistic graph, as described above with reference to FIG. 3A, transforms the knowledge graph into a Bayesian network containing information associated with the probability distributions represented by each of the random variables. As a Bayesian network, the probabilistic graph model may enable probabilistic querying of the random variables, which may be used to inferentially extract additional information that is not able to be derived from the knowledge graph alone (e.g., because the knowledge graph is limited to logical inferences). For example, the joint distribution of the probabilistic graph model may enable queries to be used to determine: whether one subset of the variables is independent of another; whether one subset of variables is conditionally independent of another subset given a third subset; and calculating conditional probabilities. It is noted that the exemplary queries and the types of information that may be obtained from the probabilistic graph model have been described for purposes of illustration, rather than by way of limitation and that probabilistic graph models generated in accordance with the concepts disclosed herein may be used in connection with other types of queries to obtain additional information from the probabilistic graph model that would not otherwise be available (i.e., via querying the knowledge graph).

The additional inference and learning capabilities of Bayesian networks leverage a joint distribution of the probabilistic graph model, which may be expressed as P(A, R, M, T, D, S). However, when the probabilistic modelling and optimization engine 124 initially converts the knowledge graph to the probabilistic graph model, the joint distribution may be unknown or incomplete (e.g., missing one or more parameters of the individual probability distributions for one or more of the random variables). For example, while certain parameters of the probability distributions of each random variable may be known, there may be some missing parameters, such as the set of all possible values and their corresponding probability functions (P).

As described above with reference to FIG. 3A, the probabilistic modelling and optimization engine 124 exploits the structure of the knowledge graph to obtain the random variables of the probabilistic graph model and the individual probability distributions for those random variables, expressed as P(A), P(R), P(M|R), P(T|R), P(D|T), P(S|T), may be obtained but some parameters may be unknown. The probabilistic modelling and optimization engine 124 leverage probability theory techniques to calculate or approximate the unknown parameters and obtain the joint distribution or an approximation of the joint distribution. For example, probability theory provides that the joint distribution decomposes into the product of prior and conditional distribution by the chain rule, which may be expressed as:

$$P(A,R,M,T,D,S)=P(A)P(R)P(M|R)P(T|R)P(D|T)P(S|T). \quad \text{(Equation 1)}$$

As show in Equation 1 above, the individual probabilities of the random variables, which are incorporated into the probabilistic graph during the above-described conversion process may be obtained, but the individual probability distributions of the random variables are incomplete (e.g., missing parameters). The probabilistic modelling and optimization engine 124 may leverage additional techniques to solve for or approximate these unknown parameters. For example, under the chain rule of probability theory the joint distribution P(A, R, M, T, D, S) may be decomposed into prior distributions and conditional distributions. The probabilistic modelling and optimization engine 124 may use known data (e.g., the data of the knowledge graph) to approximate the unknown parameters of the probability distributions for each random variable. To illustrate, letting K represent a set of data and θ represent some unknown parameters, prior distributions may be defined as P(K|θ). The conditional probability, also referred to as the posterior probability, may be derived according to:

$$\text{posterior } P(\theta|K) = \frac{\text{likelihood } P(K|\theta) \cdot \text{prior } P(\theta)}{\text{marginal likelihood } P(K)}, \quad \text{(Equation 2)}$$

where marginal likelihood P(K) is:

$$P(K)\int_\theta P(K|\theta)P(\theta)d\theta, \quad \text{(Equation 3).}$$

The integral of Equation 3 is computationally expensive and difficult to solve. To avoid these computational inefficiencies, the probabilistic modelling and optimization engine 124 may utilize approximation techniques that learn the unknown parameters (or approximations of the unknown parameters) based on the set of data (K). To illustrate, the probabilistic modelling and optimization engine 124 may define a generative program based on the probabilistic graph model. To create the generative program, the probabilistic modelling and optimization engine 124 may convert the data generation process into a series of deterministic and probabilistic statements. For example and using terminology consistent with the probabilistic graph model 300 of FIG. 3A, P(A)~Gamma(1, 1)
age~Poisson(p(A))
p(R)~Dirichlet(1)
robot~Categorical(p(R))
p(M|R)~Dirichlet(0.5)
manufacturer~Categorical(p(M|R=robot))
p(T|R)~Dirichlet(0.25)
task~Categorical(p(T|R=robot))
p(D|T)~Gamma(1,1)
duration~Exponential(p(D|T=task))
p(S|T)~Beta(1,1)
status~Bernoulli(p S|T=task))

In the exemplary statements above, the deterministic statement are those statements including an assignment (e.g., "=") and the remaining statements represent probabilistic statements. The generative program provides a model that may be used to estimate or approximate the unknown parameters. For example, the probabilistic modelling and optimization engine may configure the generative program with a set of guessed parameters and run a simulation process to produce a set of simulation data. The set of simulation data may then be compared to observed data to evaluate how closely the simulation data obtained using the guessed parameters matches or fits actual or real world data. This process may be performed iteratively until the simulated data matches the actual data to within a threshold tolerance (e.g., 90%, 95%, etc.). It is noted that as the set of data grows larger, the ability to estimate or guess the parameters may improve. Thus, the above-described learning process may be periodically or continuously performed and the accuracy of the estimations of the unknown parameters may improve as the set of data grows larger.

Figure 4:
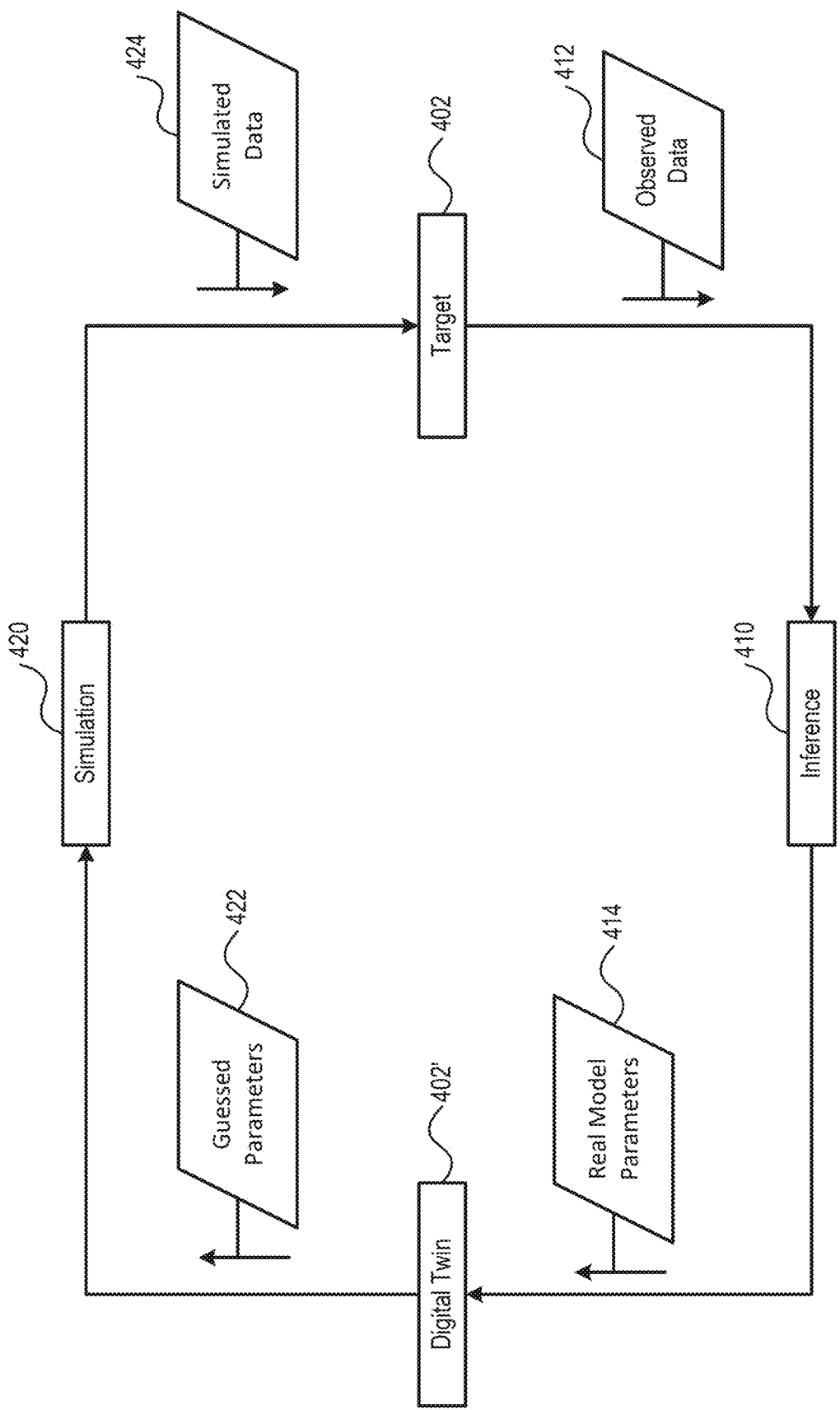
FIG. 4 is a block diagram illustrating a process for estimating unknown parameters according to the present disclosure.

The above-described learning process is illustrated in FIG. 4, which is a block diagram illustrating a process for estimating unknown parameters according to the present disclosure. In FIG. 4, a target 402 and a digital twin 402' are shown. The target 402 may correspond to a real world system, process, machine, etc. and the digital twin 402' may correspond to a digital twin of the target 402. In accordance with the concepts disclosed herein, the digital twin 402' may be generated by converting an ontology corresponding to the target 402 into a knowledge graph with embedded data and then converting the knowledge graph into a Bayesian network (e.g., a probabilistic graph model). As explained above, the probabilistic graph model may include unknown parameters.

In FIG. 4, an inference process 410 is shown. The inference process 410 may be configured to receive a set of observed data 412 (i.e., data observed from the target 402) as input and generate the digital twin 402' that explains the set of observed data 412. To generate the digital twin 402' the inference process 410 calculates the real model parameters 414 according to $p(y_{obs}|\theta_{guess})P(\theta_{guess})$, which is a process similar to Equations 2 and 3 and is computationally expensive and complex.

In contrast to the inference process 410, digital twins generated in accordance with the present disclosure (i.e., by the computing device 110 of FIG. 1 and more specifically, by the graphing engine 122 and the probabilistic modelling and optimization engine 124 of FIG. 1) may utilize a simulation process 420. As described above, the simulation process may utilize a generative program or model derived from a probabilistic graph created in accordance with the present disclosure. The generative program may be configured with a set of guessed parameters 422 and then the simulation process 420 is run using the generative program having the set of guessed parameters 422. During the simulation process 420, a set of data (e.g., the data embedded in the knowledge graph) may be fed to the generative model to produce a set of simulated data 424. The simulated data 424 may be a set of probability distributions for the random variables of the probabilistic graph model (i.e., the digital twin 402'). The set of simulated data 424 may then be compared to the observed data 412 to determine how closely the simulated data 424 matches or fits the observed data 412. If the simulated data 424 does not match the observed data 412 to within a threshold tolerance (i.e., does not provide a sufficient fit to the observed data 412), the set of guessed parameters 422 may be modified and the simulation process 420 may be executed using the generative program configured with the new set of guessed parameters. If the simulated data matches the observed data 412 to within the threshold tolerance (i.e., provides a sufficient fit to the observed data 412), the set of probability distributions may be used in the probabilistic graph model.

As explained above and referring back to FIG. 1, the outputs produced via the simulations performed using the generative program may include a set of probability distributions. The set of probability distributions derived from the simulations may be similar to the set of parameters in the probabilistic graph model derived from the knowledge graph, but the set of unknown parameters have been replaced with the guessed parameters from the simulation that produced simulation data fitting the actual data to within the threshold tolerance. Once the set of guessed parameters providing an acceptable fit to the actual data are found, the probability distributions may be incorporated into the probabilistic graph model. Incorporating the probability distributions into the model may include embedding the probability distributions into the probabilistic graph model in association with an edge or a node to which each probability distribution corresponds.

Figure 3B:
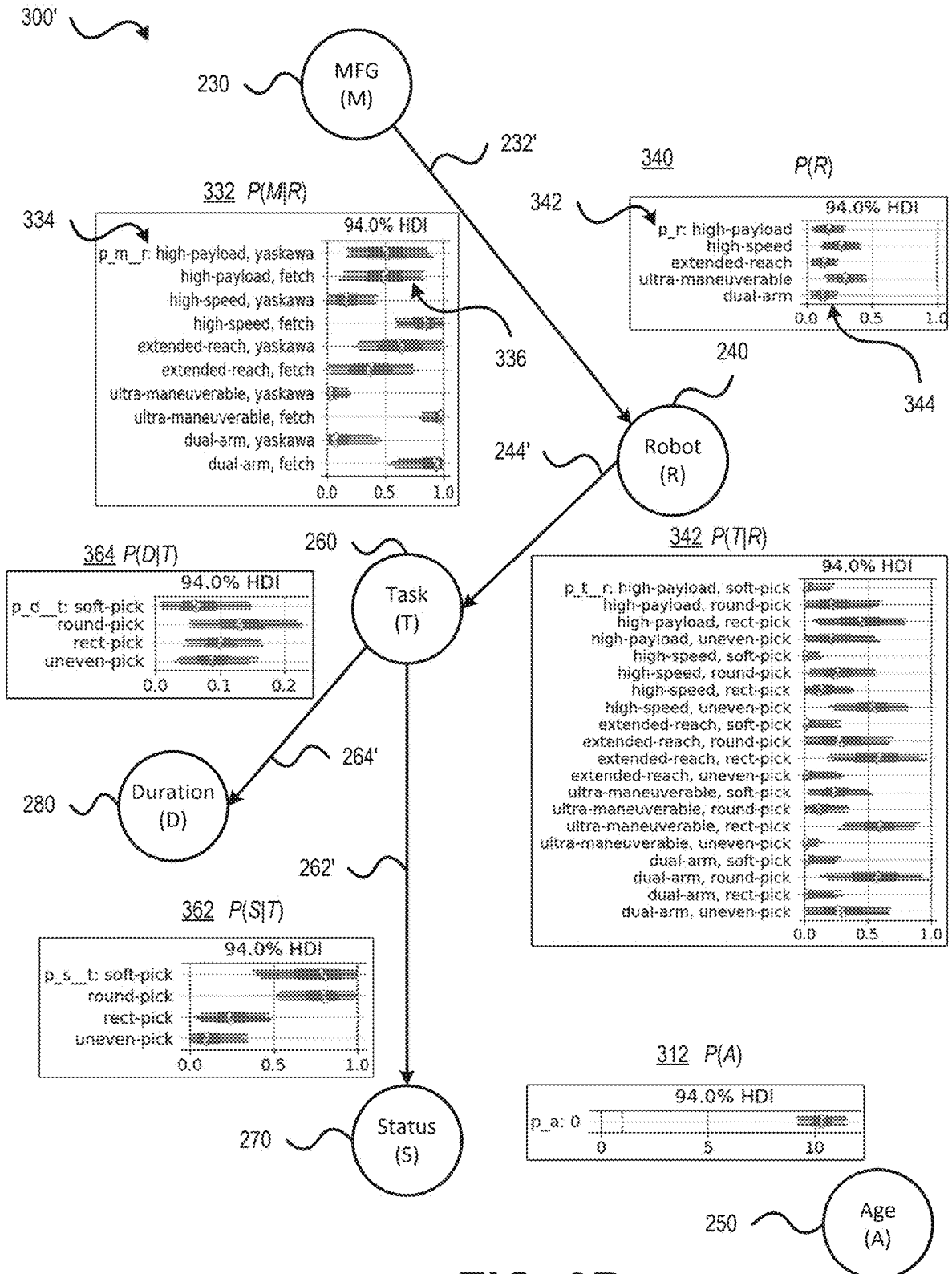
FIG. 3B is a block diagram illustrating a probabilistic graph model in accordance with the present disclosure.

To illustrate and referring to FIG. 3B, a block diagram illustrating a probabilistic graph model in accordance with the present disclosure is shown as a probabilistic graph model 300'. As described above with reference to FIG. 3A, the probability distributions of the random variables of the probabilistic graph model 300 have unknown parameters, but using the learning process described above with reference to FIGS. 1 and 4, approximations of the unknown parameters may be learned through simulation using a generative program. Once the unknown parameters are obtained, probability distributions P(A), P(R), P(M|R), P(T|R), P(D|T), P(S|T) having the approximated parameters may be embedded within the probabilistic graph model 300 to produce the probabilistic graph model 300'.

As shown in FIG. 3B, embedding the probability distributions into the probabilistic model 300' may associate the probability distributions with an edge or a node. In particular, where probability distributions are associated with edges when the probability distributions correspond to statistical dependencies between a pair of nodes and probability distributions associated with independent random variables may be associated with nodes. For example, in FIG. 3B the probability distribution P(A) 312 is associated with the node 250 and the probability distribution P(R) 340 is associated with the node 240, while the probability distributions P(M|R) 332, P(T|R), P(D|T) 364, P(S|T) 362 are associated with the edges 232', 244', 264', and 262', respectively.

Once the probability distributions having the guessed parameters are added, the probabilistic graph model 300' may be queried to obtain information that would otherwise not be available using a knowledge graph. For example, the probabilistic model 300' represents a model of an environment where different robots performs tasks. The probability distribution P(R) 340 includes all possible values 342 of the variable R (e.g., the variable R may take on values of "high-payload", "high-speed", "extended-reach", "ultra-maneuverable", and "dual-arm") and each possible value may have an associated probability 344. Similarly, the probability distribution P(M|R) 332 includes all possible values 334 for the statistical dependency (represented by edge 232') for the variables M and R (e.g., the possible combinations for the variables M, R may include "high-payload, yaskawa", "high-payload, fetch", "high-speed, yaskawa", "high-speed, fetch", "extended-reach, yaskawa", "ultra-maneuverable, yaskawa", "ultra-maneuverable, fetch", "dual-arm, yaskawa", and "dual-arm, fetch") and each possible value may have an associated probability 336. The probability distributions P(A) 312 may follow a structure similar to the probability distribution P(R) 340, but provide all possible values and their corresponding probabilities for the random variable A; the probability distributions P(T|R), P(D|t) 364, P(S|T) 362 may follow a structure similar to the probability distribution P(M|R) 332, but provide all possible values and their corresponding probabilities for the statistical dependencies associated with their random variable pairs (e.g., T|R, D|T, S|T, respectively).

Referring back to FIG. 1, with the probability distributions (with the guessed parameters) for each of the random variables embedded into the probabilistic graph model, the joint distribution may be obtained via the product of the individual probability distributions using Equation 1. As explained above, once the joint distribution is known, queries may be used to infer or obtain information from the probabilistic model that could not be inferred using the knowledge graph, which is limited to logical inferences. The queries of the probabilistic graph model may be based on any of the random variables or combinations thereof. For example, the probabilistic graph model may be queried to determine whether one subset of variables is independent of another, or whether one subset of variables is conditionally independent of another of variables given a third subset (e.g., is A conditionally independent of M given R). Additionally, conditional probabilities may be calculated. Exemplary and non-limiting examples illustrating use of queries to extract information from probabilistic graph models in accordance with the present disclosure are described in more detail below with reference to FIGS. 6A-8J.

As shown above, the computing device 110 provides a suite of tools (e.g., the data ingestion engine 120, the graphing engine 122, and the probabilistic modelling and optimization engine 124) providing functionality for constructing knowledge graphs and extend the knowledge graphs by transforming them into probabilistic models. The probabilistic graph models may be used to extract additional information and insights from a set of data (e.g., the set of data used to generate the knowledge graphs). In the context of digital twins, the probabilistic graph models provide users with enhanced understanding of the real world counterpart represented by the probabilistic graph model.

In addition to providing enhanced information, the suite of tools enables users to create digital twins in an intuitive manner without requiring expansive knowledge of programming and modelling techniques. To illustrate, the system 100 of FIG. 1 includes a computing device 130 communicatively coupled to the computing device 110 via the one or more networks 130. As shown in FIG. 1, the computing device 130 includes one or more processors 132 and a memory 134. The one or more processors 132 may include one or more microcontrollers, ASICs, FPGAs, CPUs and/or GPUs having one or more processing cores, or other circuitry and logic configured to facilitate the operations of the computing device 130 in accordance with aspects of the present disclosure. The memory 134 may include RAM devices, ROM devices, EPROM, EEPROM, one or more HDDs, one or more SSDs, flash memory devices, NAS devices, or other memory devices configured to store data in a persistent or non-persistent state. Software configured to facilitate operations and functionality of the computing device 130 may be stored in the memory 134 as instructions 136 that, when executed by the one or more processors 132, cause the one or more processors 132 to perform the operations described herein with respect to the computing device 130, as described in more detail below. Additionally, the memory 134 may be configured to store data and information in one or more databases 138. For example, the one or more databases 138 may store one or more ontologies and data representative of the real world counterpart defined by the ontology. Other types of information suitable for generating knowledge graphs and probabilistic graph models in accordance with the present disclosure may also be stored in the one or more databases 138.

A user of the computing device 130 may access the GUIs 128 provided by the computing device 110, which may provide the user with access to functionalities provided by the data ingestion engine 120, the graphing engine 122, and the probabilistic modelling and optimization engine 124. For example, the GUIs 128 may be accessed as one or more web pages using a web browser of the computing device 130. The GUIs 128 may enable the user to upload, via the ingestion engine 120, a dataset for use in generating a probabilistic graph model in accordance with the present disclosure. The dataset may be obtained in the one or more databases 138. Additionally or alternative, the dataset may be obtained from one or more data sources 150 external to the computing device 130.

Once the dataset is uploaded to the computing device 110, the GUIs 128 may provide access to interactive elements that enable the user to generate a probabilistic graph model from the uploaded dataset. For example, the GUIs 128 may include a button or other interactive element that enables the user to initiate generation of the probabilistic graph model using the uploaded dataset. Once activated, the functionality of the graphing engine 122 may be executed against the dataset to produce a knowledge graph, such as the knowledge graph 202 of FIG. 2B. The knowledge graph may then be provided to the probabilistic modelling and optimization engine 124 transformed into a probabilistic graph model. As described above, any unknown parameters of the individual random variables of the probabilistic graph model may be approximated by the probabilistic modelling and optimization engine 124 using a generative program derived from the probabilistic graph model and simulation. It can be appreciated from the foregoing that the functionality of the computing device 110 may enable the user to create digital twins in a rapid manner without requiring the user to have knowledge of programming, probability theory, and the like.

Through exploitation of the knowledge graph structure, the probabilistic modelling and optimization engine 124 is able to quickly identify the set of random variables and statistical dependencies and then leverage concepts from probability theory to compute the joint distribution of the probabilistic graph model using the probability distributions (e.g., with unknown parameters replaced by guessed parameters) for the random variables and Equation 1. As such, the computational complexity and computing resources required to determine the probabilistic graph models may be reduced.

In addition to providing functionality for creating probabilistic graph models, the GUIs 128 may also enable the user to query the probabilistic graph model. For example, the GUIs 128 may provide a query builder that enables the user to intuitively construct queries, run the queries against the probabilistic graph model, and view the results. The GUIs may also provide the user with the ability to view the knowledge graph and the probabilistic graph model, compare different portions of the knowledge graph and the probabilistic graph model, review analytics, and run simulations. The GUIs 128 may also be configured to present the user with information indicating one or more pieces of data in the dataset used to construct the knowledge graph and the probabilistic graph model are missing. For example, suppose that the dataset used to construct the probabilistic graph model was the dataset 220 FIG. 2C. As shown in FIG. 2C, the first row of the dataset 220 is missing values for the age and task columns, the second row is missing the robot and manufacturer values, the third row is missing the task, and the sixth row is missing the duration value, and the seventh row is missing the manufacturer value. Instead of leaving these values blank or populating them with a mean or some other calculated value, queries may be used to obtain probability distributions for all possible missing values, and one of the possible values returned based on the query may be used to fill in the missing values. For example, for the seventh row a query may be used to recommend a manufacture given the known values in the seventh row (e.g., the query may represent the question "Who is the manufacture performed given the robot is "high-payload", the age is "4", the tasks is "uneven-pick", the duration is "15.26282063", and the status is "failure"). The query may return a probability distribution for all possible manufacturer values and the missing value may be replaced by the value having the highest probability (i.e., the manufacture having the highest probability of being the manufacturer based on the given data). A similar approach may be used to populate the missing values in the other rows except the missing values and given values are different. As shown above, the probabilistic graph model enables missing values to be determined in a probabilistic manner, which may be more accurate as compared to simply using a default value or some other calculated value, such as a mean.

The query generating functionality provided by the GUIs 128 may also enable the user to create queries for purposes of prediction, forecasting, or what if analysis. For example, where the probabilistic graph model includes a variable (or node) associated with time (T), a query may be defined with (T=x days in future) and the query will return a probability distribution of all possible values for the queried data. Additional examples of the types of functionality and analytics that may be provided by the computing device 110 and accessed via the GUIs 128 are described below with reference to FIGS. 9A-9D.

As can be appreciated from the foregoing, the system 100 enables digital twins to be created using an ontology driven design. For example, the system 100 enables a user to create a digital twin and define its capabilities by designing and configuring ontology models. The ontologies are realized as rich knowledge graphs with nodes and edges representing semantic meaning enabling logical inferences for retrieving implicit knowledge.

The system 100 also provides the advantage of utilizing a single data representation (e.g., data+AI) in which the data model (e.g., the knowledge graph) and the statistical (AI/ML) model of the data (e.g., the probabilistic graph model) are tightly coupled. As such, there is no need to move the data out of the platform to run analytics. Also, since the analytics model is tightly integrated with the data, the data may be expressed both deterministically and probabilistically, which speeds up computation.

As noted above, the system 100 also provides probabilistic querying capabilities by generating a probabilistic representation of the data, which turns the knowledge graph into a probabilistic database. This enables users to obtain answers to complex ad-hoc conditional probabilistic queries regarding values of nodes (i.e., random variables) with uncertainty quantification (answers to queries are distributions, not single values). As a result, the user can perform a more meaningful and robust what-if analysis.

Another advantage provided by the system 100 is that unknown parameters are learned directly from the data. In particular, the probabilistic modelling and optimization engine requires very little prior knowledge about the domain and lets the data speak for itself. Probability estimates are inferred directly from data in an online learning manner (e.g., Bayes rule). Also, domain knowledge is taken into consideration when available, but not required. It is noted that Bayesian networks have been used previously, but the parameters were derived by subject matter experts rather than being derived from the data itself.

The system 100 may also be used to perform automated "optimal" decision-making through simulation, optimization, and uncertainty quantification. This enables optimize decisions to be made over all plausible future realizations of the target outcome. Problems within the relevant domain may be compiled into an optimization problem with minimal user input, and enables simulation of outcomes to be executed and used to solve optimization problems without the user needing to know how to perform the computations. It is noted that the various advantages descried above have been provided for purposes of illustration, rather than by way of limitation.

Figure 5A:
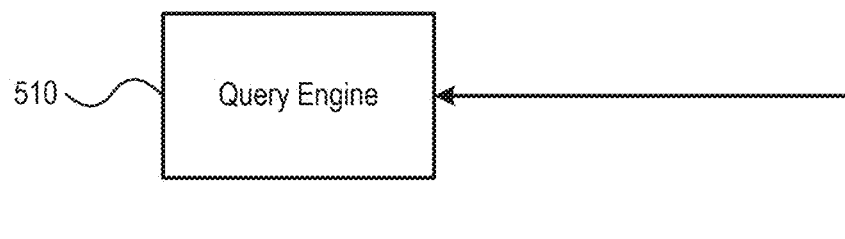
FIGS. 5A-5C show diagrams illustrating exemplary queries for extracting information from digital twins in accordance with the present disclosure.
Figure 5A:
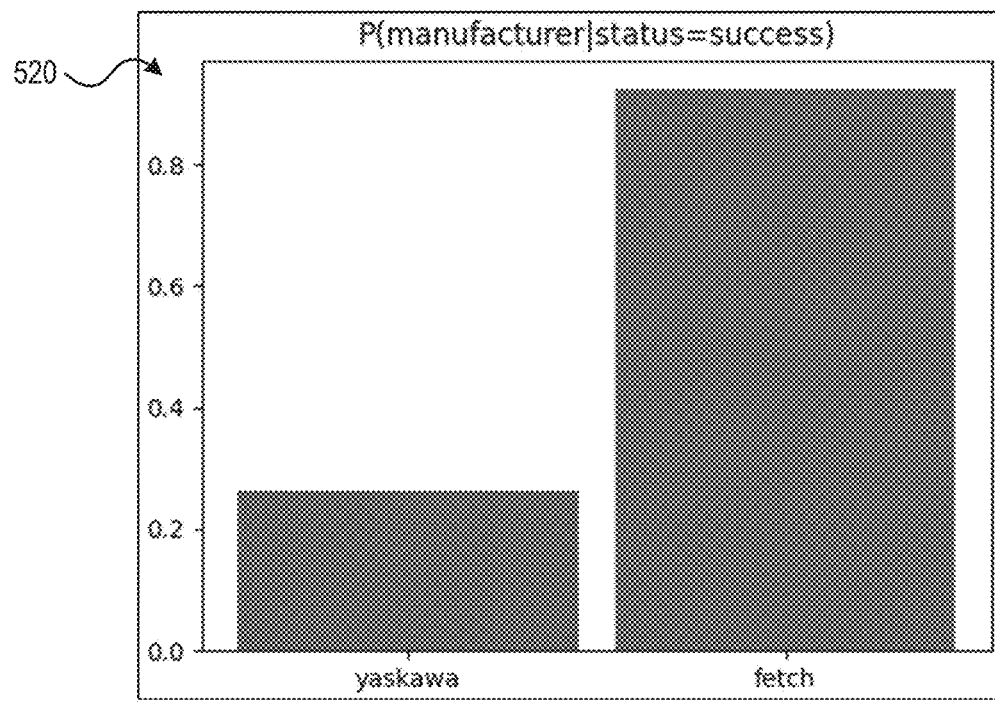
Figure 5B:
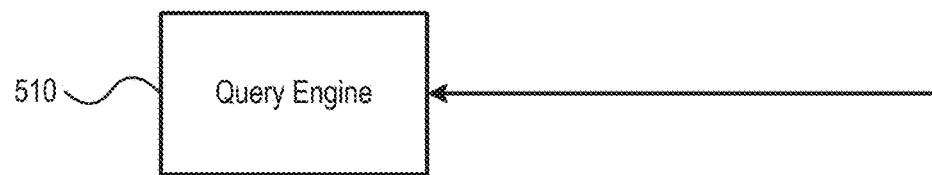
Figure 5B:
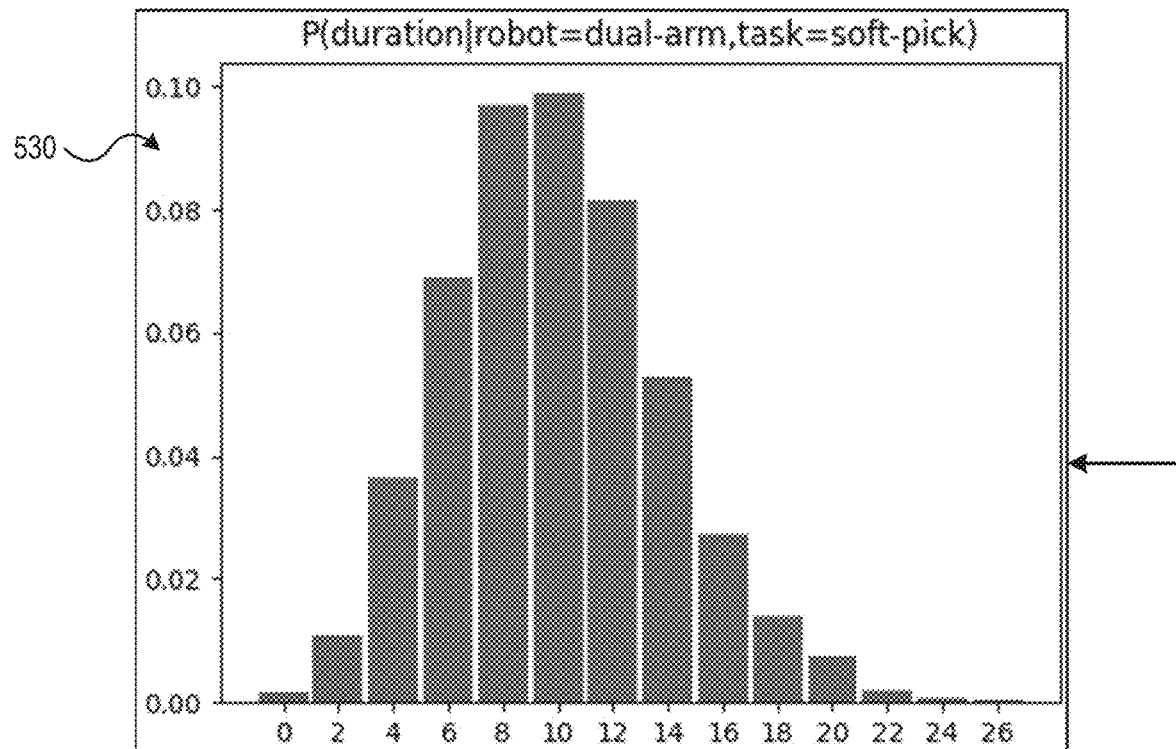
Figure 5C:
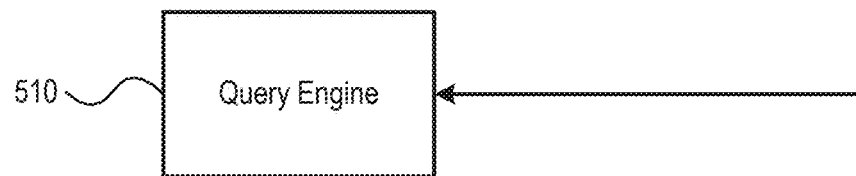
Figure 5C:
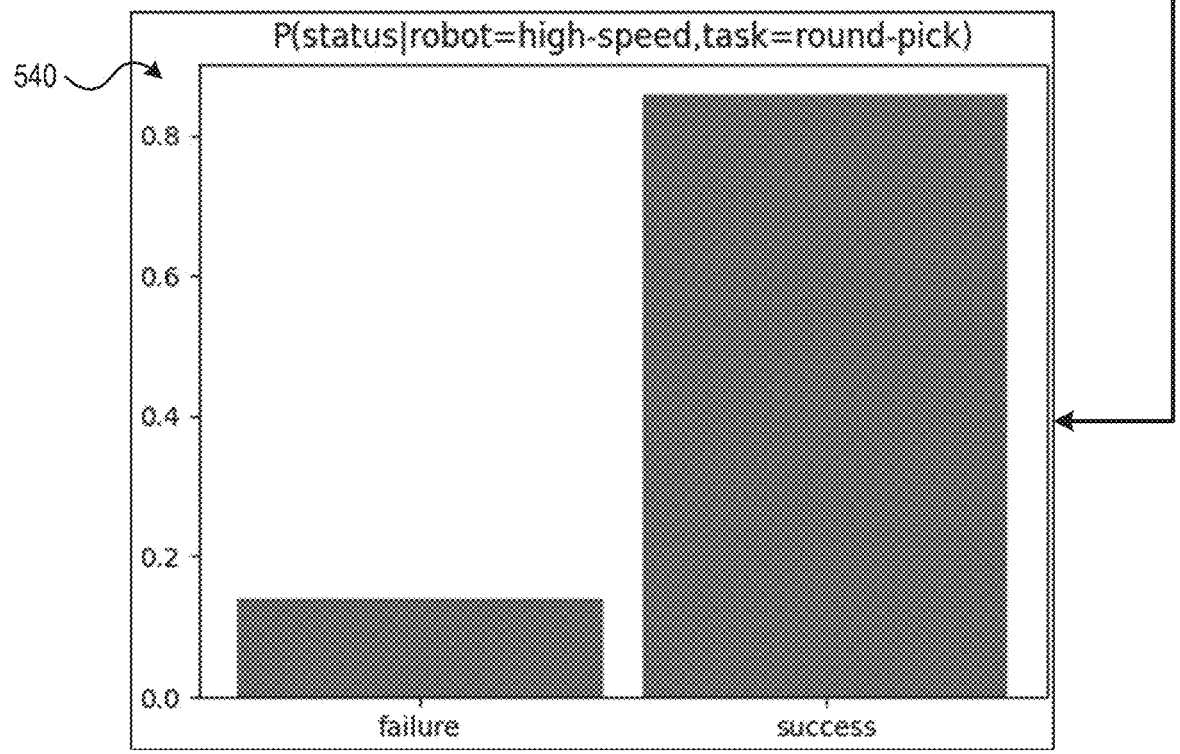

Referring to FIGS. 5A-5C, diagrams illustrating exemplary aspects of querying a probabilistic graph model in accordance with the present disclosure are shown. In FIGS. 5A-5C a query engine 510 and various queries are described with reference to the random variables described and illustrated with reference to FIGS. 3A and 3B are utilized. The query engine 510 may be a module of the probabilistic modelling and optimization engine 124 of FIG. 1 or may be a separate component of a computing system (e.g., the computing device 110, the computing device 130, and/or the cloud-based system 142 of FIG. 1). In an aspect, the query engine 510 may provide functionality to build queries and execute the queries against a probabilistic graph model.

In FIG. 5A, a query P (MS success) is defined. This query may be used to analyze the question: What is the best performing manufacturer? Executing the query against the probabilistic graph model represented by the joint distribution P(A, R, M, T, S, D) returns a distribution 520. As shown in the distribution 520, the manufacturer "fetch" has a higher probability of successfully completing a task as compared to the manufacturer "yaskawa."

In FIG. 5B, a query P(D|R=dual-arm, T=softpick) is defined. This query may be used to analyze the question: What is the expected duration of a soft object pick performed by a dual-arm robot? Executing the query against the probabilistic graph model represented by the joint distribution P(A, R, M, T, S, D) returns a distribution 530. As shown in the distribution 530, the expected duration of 10 seconds has the highest probability while the expected duration of 26 seconds has the lowest probability. It is noted that this query could be modified to evaluate the expected duration of performing other types of tasks using a dual-arm robot by changing the task variable T and/or may be modified to evaluate the expected duration of performing the soft object pick using another type of robot (i.e., other than a dual-arm robot) by changing the variable DIR.

In FIG. 5C, a query P(S|R=high-speed, T=round-pick) is defined. This query may be used to analyze the question: What is the likelihood of task failure if we assign a high-speed robot to pick round objects? Executing the query against the probabilistic graph model represented by the joint distribution P(A, R, M, T, S, D) returns a distribution 540. As shown in the distribution 540, the likelihood of success is greater than the likelihood of failure.

It is to be appreciated that the exemplary queries described with reference to FIGS. 5A-5C are provided for purposes of illustration, rather than by way of limitation. Furthermore, it is noted that the queries described with reference to FIGS. 5A-5C involve variable combinations that are not directly present in the probabilistic graph model. For example, the probabilistic graph model 300' of FIG. 3B does not include a probability distribution for the variable combination D|R or the variable combination S|R. Instead, the distributions returned by these queries and variable combinations represent data inferred from the probabilistic graph model. Such inferences are not possible using only knowledge graphs.

Figure 6A:
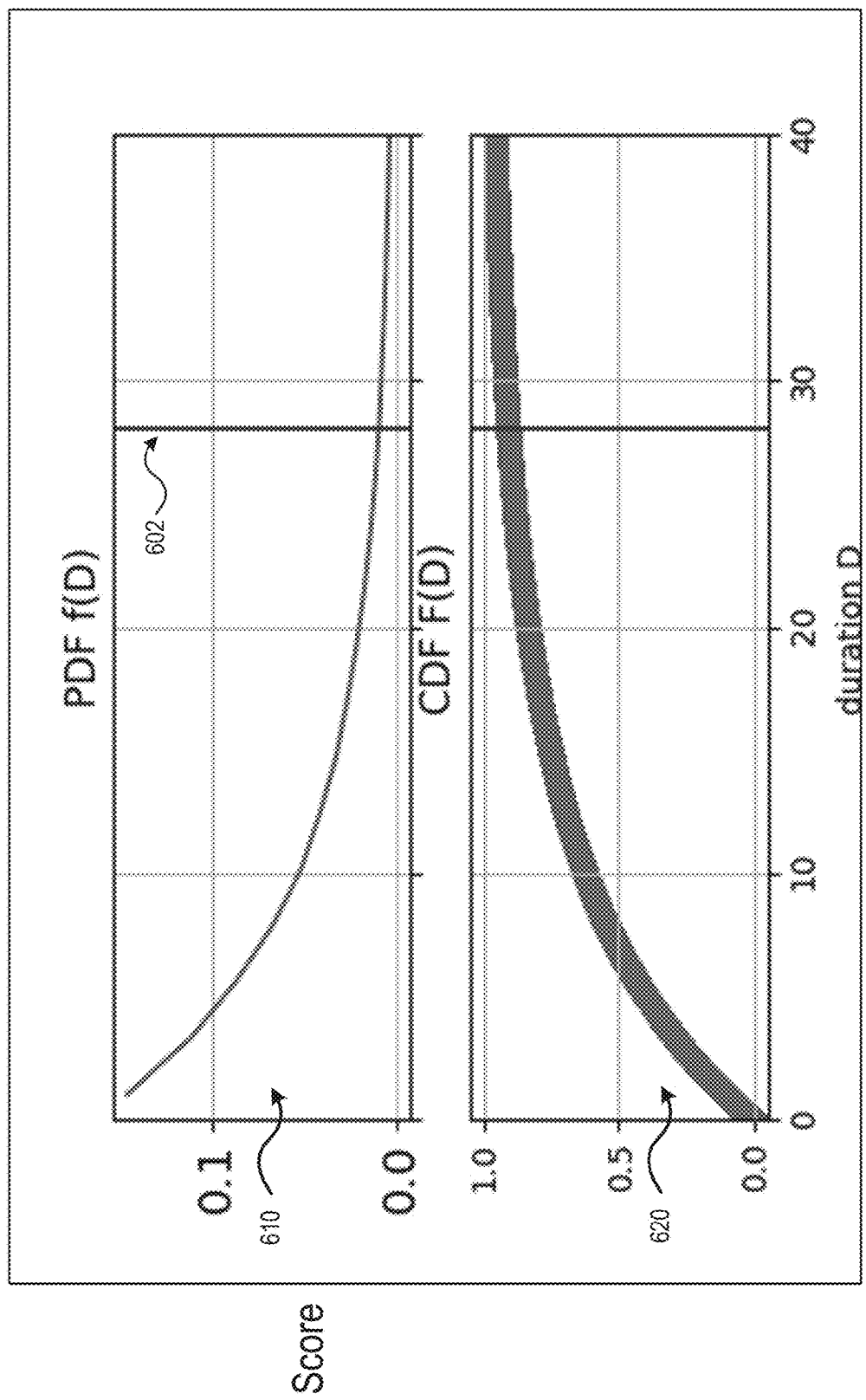
FIGS. 6A-6C illustrate exemplary distribution data obtained in accordance with aspects of the present disclosure.
Figure 6B:
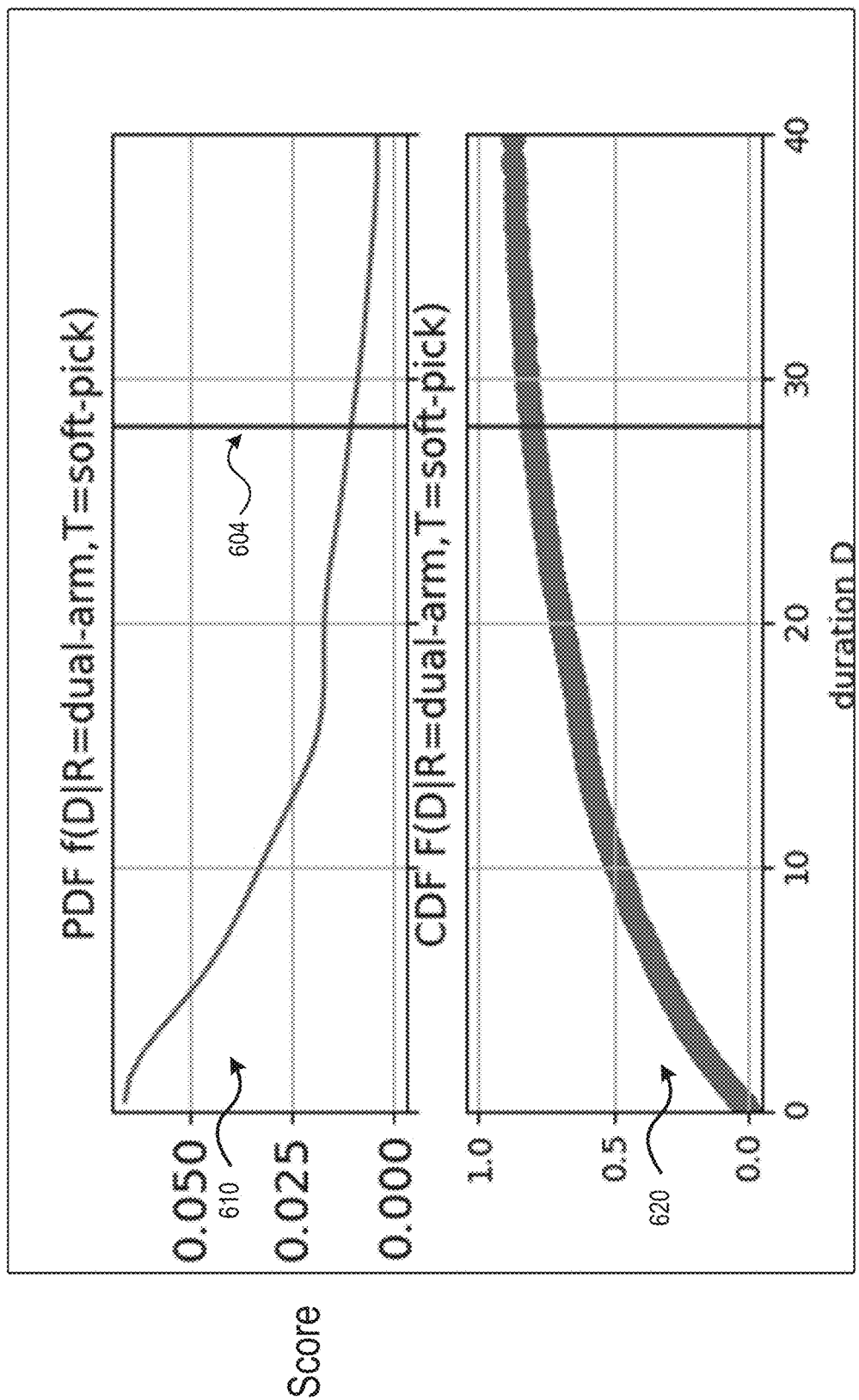
Figure 6C:
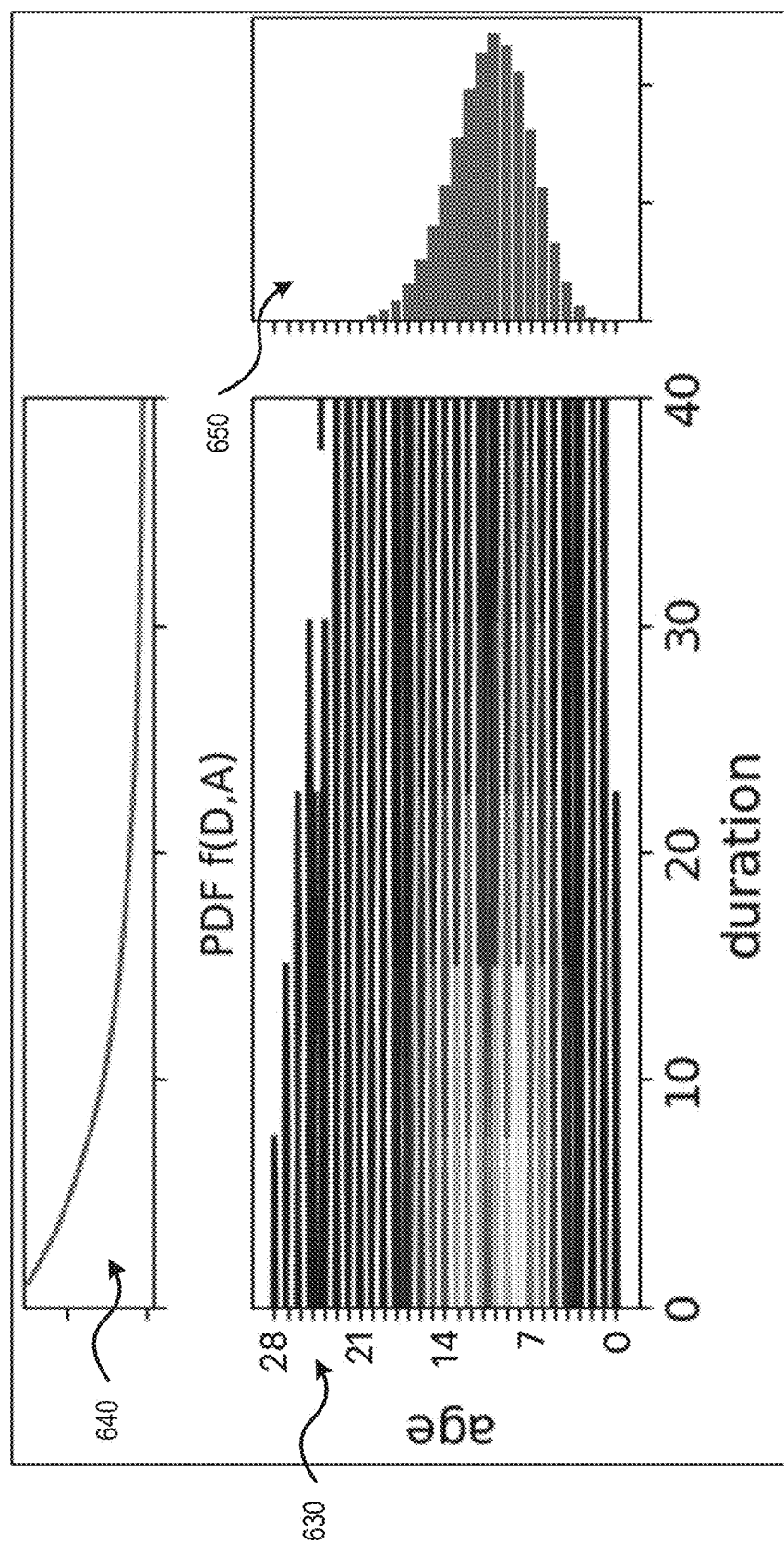

Referring to FIGS. 6A-6C, diagrams illustrating outlier detection using probabilistic graph models in accordance with the present disclosure are shown. In FIG. 6A, a diagram 610 (top) and a diagram 620 (bottom) are shown. Plot 610 represents a plot of the probability distribution function (PDF) for the variable/) (e.g., duration) and plot 620 represents a plot of the cumulative distribution function (CDF) for the variable D. Using the concepts described above, a query may be designed to evaluate: "How anomalous a particular value is?" For example, in FIG. 6A, the query (e.g., PDF f(D)), CDF F(D))) may be defined to evaluate "How anomalous a duration (I) of 28 is?" The result is indicated for the PDF and CDF by the intersection of line 602 with the plots 610, 620, respectively. As shown in FIG. 6A, the score or likelihood that the specified duration (e.g., 28) is anomalous may be high, indicating the specified duration is an outlier.

In addition to single variable analysis, the probabilistic graph model may also facilitate anomaly analysis using conditional queries. For example, in FIG. 6B, a query PDF f(D|R=dual-arm, T=soft-pick), CDF F (D|R=dual-arm, T=soft-pick) may be defined to evaluate "How anomalous is a duration of 28 given that the task is a soft-pick?" and the results are indicated in FIG. 6B by the intersection of line 604 with the PDF and CDF plots 610, 620. As a result of more information being considered as compared to the query of FIG. 6A, the score may be reduced for the query of FIG. 6B (e.g., 0.8 instead of 0.9 in FIG. 6).

In addition to performing anomaly analysis based on a single variable (FIG. 6A) and using conditional statements (FIG. 6B), the probabilistic graph model may also facilitate outlier analysis for two or more variables. For example, in FIG. 6C, a joint PDF f(D, A), joint CDF F(D, A) may be defined to evaluate "How anomalous is it to observe a duration of 28 and an age of 11 at the same time?" and the results may be indicated by the color shading of the density plot 630 corresponding to the joint CDF/(D, A), a plot 640 corresponding to the marginal PDF f(D), and histogram 650 corresponding to the marginal PDF f(A).

Figure 7A:
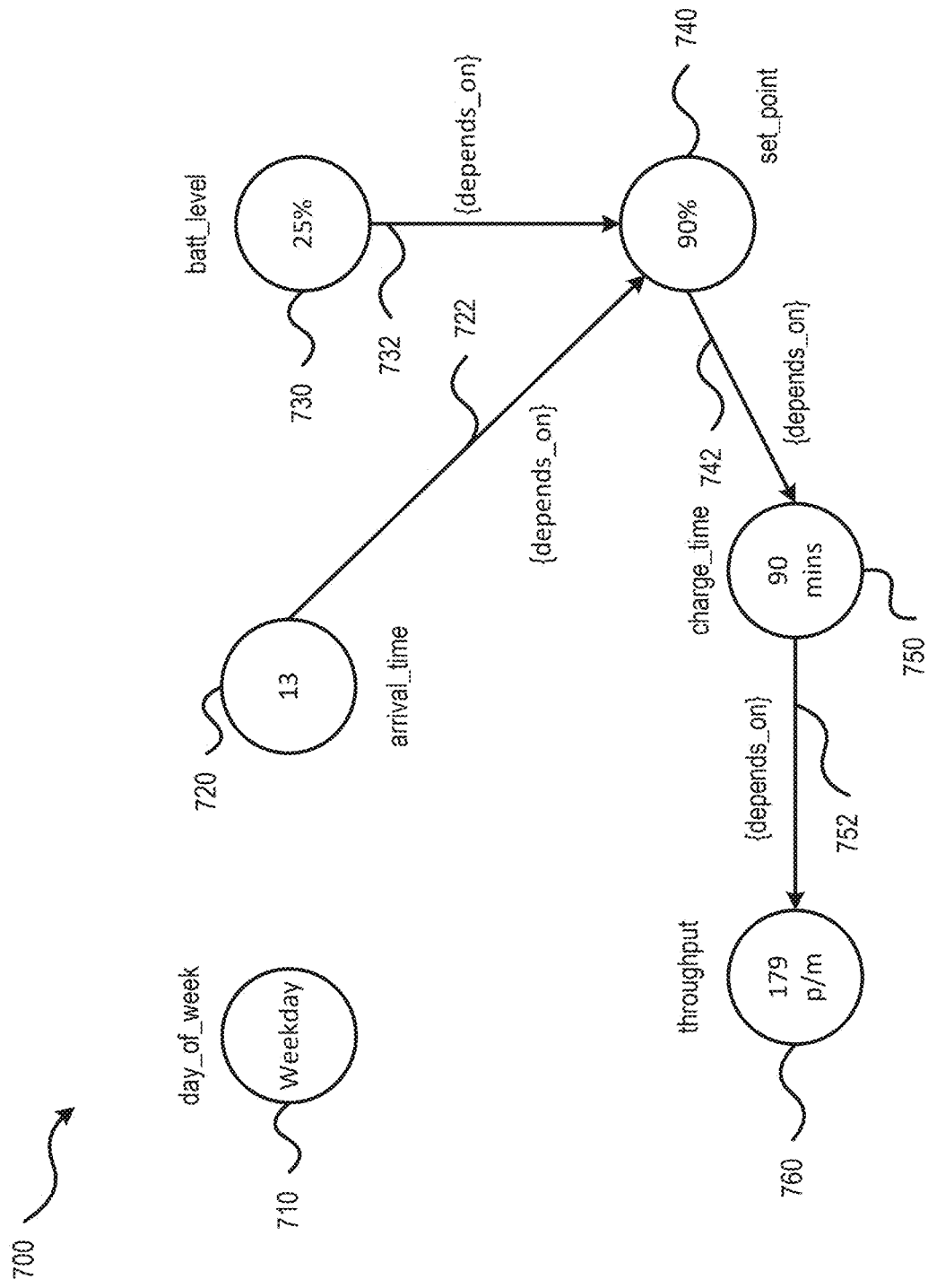
FIGS. 7A-7C show a sequence of block diagrams illustrating techniques for performing optimal decision making using probabilistic graph models in accordance with the present disclosure.
Figure 7B:
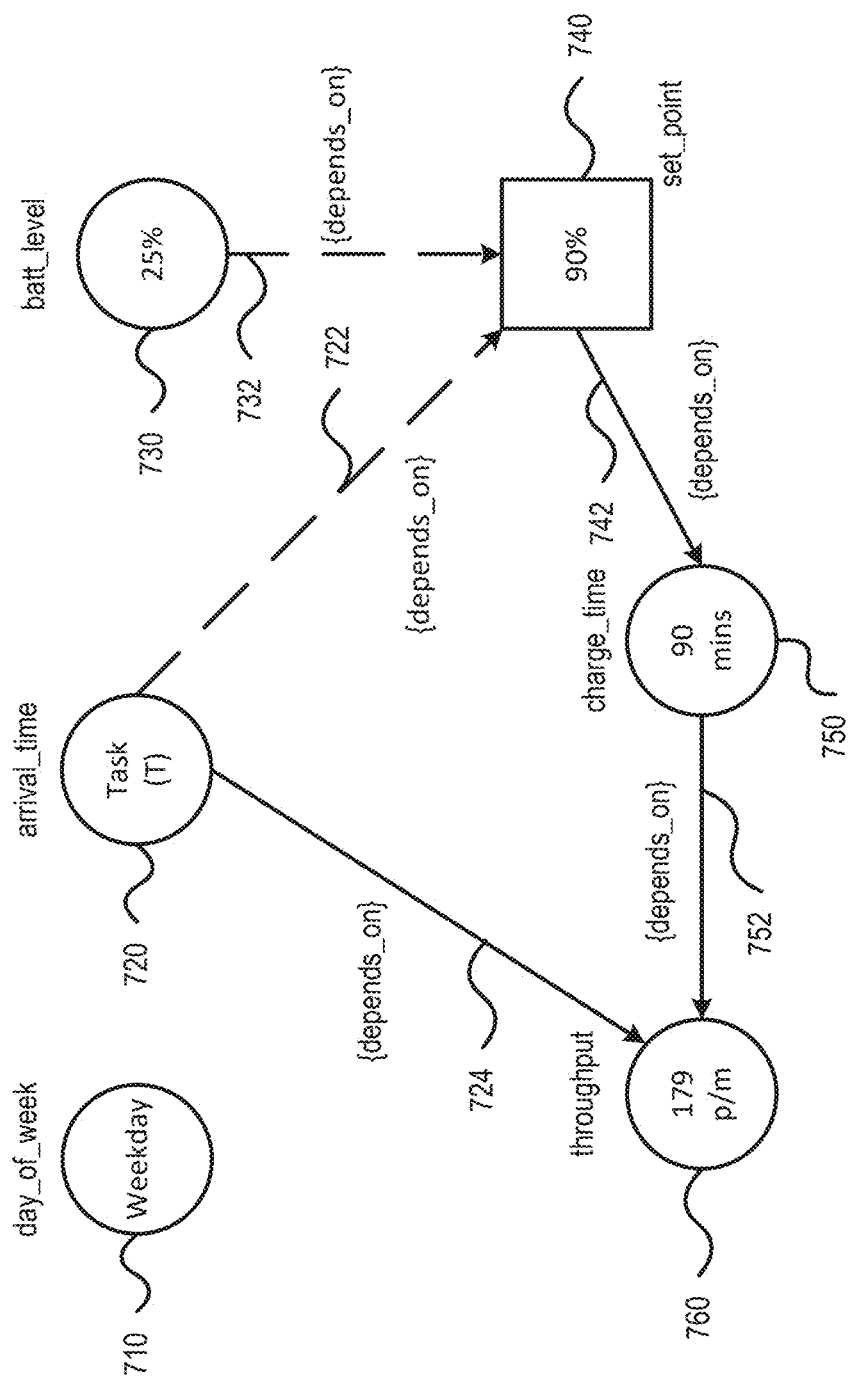
Figure 7C:
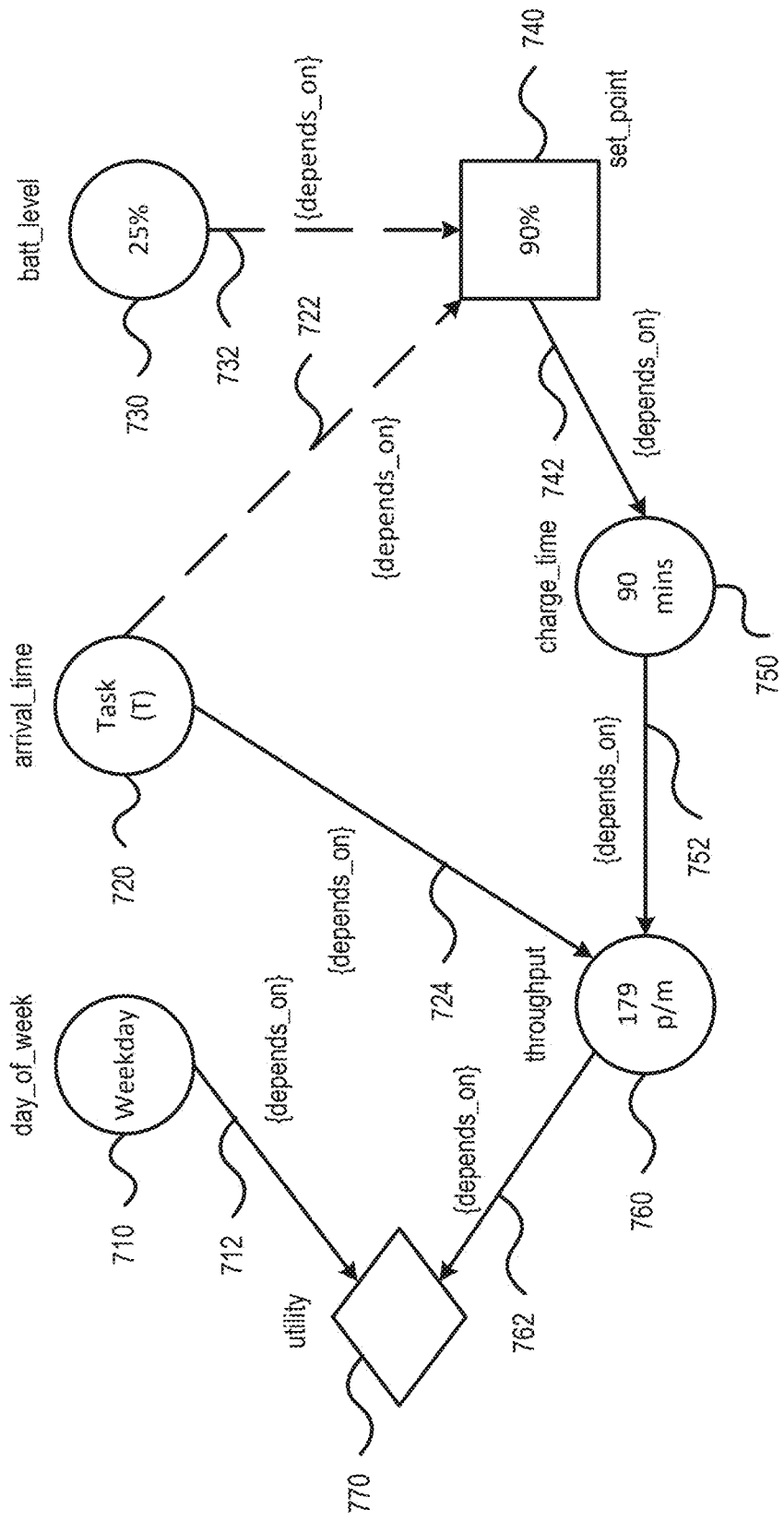

Referring to FIGS. 7A-7C, a sequence of block diagrams illustrating techniques for performing optimal decision making using probabilistic graph models in accordance with the present disclosure are shown. In FIGS. 7A-7C, a probabilistic graph model 700 associated with a use case involving a robot that is used to unload trucks arriving at a loading dock is shown. The probabilistic graph model includes a node 710 associated with the weekday (e.g., the trucks may arrive for unloading on different days of the week), a node 720 associated with the set of possible arrival times for the truck(s), a node 730 associated with the battery level of the robot, a node 740 associated with a set point indicating a battery level percentage (%) at which the robot stops charging, a node 750 associated with the charge time (e.g., the amount of time the robot needs to charge to the specified set point and the charge level of the battery), and a node 760 associated with throughput of the facility (e.g., how many items per minute can the robot unload). Node 720 may be connected to node 740 via edge 722 pointing from node 720 to node 740. Node 730 may be connected to node 740 via edge 732 pointing from node 730 to node 740. Node 740 may be connected to node 750 via edge 742 pointing from node 740 to node 750. Node 750 may be connected to node 760 via edge 752 pointing from node 750 to node 760. Each of the edges 722, 732, 742, 752 may represent a statistical dependency where the node pointed to by a respective one of the edges 722, 732, 742, 752 depends on the node from which the edge originates (e.g., node 740 is statistically dependent on nodes 720, 730, and so on). The probabilistic graph model 700 may have been generated from an ontology and other data using the graphing engine 122 and the probabilistic modelling and optimization engine 124 of the computing device 100 of FIG. 1. As such, the joint distribution of the probabilistic graph model 700 may be known (with unknown parameters assuming guessed parameter values determined using the learning and simulation process described with reference to FIGS. 1 and 4).

As described above, the probabilistic graph model 700 may be queried to infer data that may not be readily obtained from a knowledge graph or the data from which the knowledge graph was created. The examples described above have primarily related to queries designed to extract statistical inferences or other types of information about the domain represented by the probabilistic graph model. However, an additional capability provided by the digital twin generated in accordance with the present disclosure is the ability to use the probabilistic graph models to perform optimization under uncertainty. In the scenario represented by the probabilistic graph model 700, one such optimization may be the solution to the question "How much should the robot charge the battery?" This question can be formulated as an optimization problem because there is a tradeoff between under-charging the battery and over-charging the battery. In particular, if the battery is under-charged the robot may run out of battery power and need to recharge during peak demand and if the battery is over-charged there is a risk demand will arrive during charging. Moreover, this problem also has uncertainty since the time when the demand may arrive is unknown, although the probabilistic graph model may be used to derive a distribution for the arrival of the demand.

As shown in FIGS. 7B and 7C, to use the probabilistic graph model 700 to solve the optimization problem described above, the decision-making process may be incorporated into the graph 700. This may be achieved by introducing decision nodes, utility nodes, and information edges into the graph 700, as shown in FIG. 7B, where the edges 722, 732 are the information edges and the decision node is the node 740. FIG. 7B also shows that an edge 724 pointing from the node 720 to the node 760 has been added to the graph 700. As shown FIG. 7C, a utility node 770 has been introduced into the graph 700 and connected to the nodes 710, 760 to be optimized, in this example, throughput, which may have different requirements on weekdays and weekends. In an aspect, the decision node may be specified by the user, such as by clicking on a node of the probabilistic graph model displayed within a GUI (e.g., one of the GUIs 128 provided by the computing device 110 of FIG. 1). Additionally, the user may interact with the probabilistic graph model via the GUI to specify the target to be optimized (e.g., throughput in the example above). Once the target for the optimization is selected, the utility node may be automatically added to the probabilistic graph model (e.g., by the probabilistic modelling and optimization engine 124 of FIG. 1 or another component of the computing device 110).

Once the decision node and utility node have been added to the probabilistic graph model 700, the optimization problem may be defined, where the optimization seeks to find a value of the set point (e.g., the decision node 740) that maximizes the expected value of the utility node 770. This optimization problem may be expressed as:

Given a Decision node (i.e., battery set point) A={$a_1$, . . . , $a_k$}

And a Target Outcome node (i.e., throughput) X={$x_1$, . . . , $x_N$})

And a Probabilistic Outcome Model (i.e., the probabilistic graph model 700) P (X|A)

And a Utility function U: X→$\mathbb{R}$

Applying the principle of Maximum Expected Utility, a decision a* may be chosen that maximizes the expected utility:

$$EU_a = \Sigma_x P(X=x, A=a) U(x,a), \quad \text{(Equation 4)}$$

$$a^* = \arg\max_{a \in A} EU_a. \quad \text{(Equation 5)}$$

Once the optimization problem is defined, the probabilistic graph model 700 may be used to solve the optimization problem. The solution to the optimization problem may represent an optimized configuration of the decision variable within the probabilistic graph model. Since the probabilistic graph model represents a digital twin of the real world counterpart, the solution to the optimization problem may also represent an optimum configuration of the real world counterpart. As such, the solution to the optimization problem may be used to generate a control signal and the control signal may be transmitted to the real world counterpart. For example, in the example described above, the optimization problem seeks to optimize the set point, which represents a level of charge that a robot achieve during a charging cycle or session. Transmitting the control signal to the real world counterpart of the robot may enable the real world counterpart to be operated in an optimal manner.

Figure 8A:
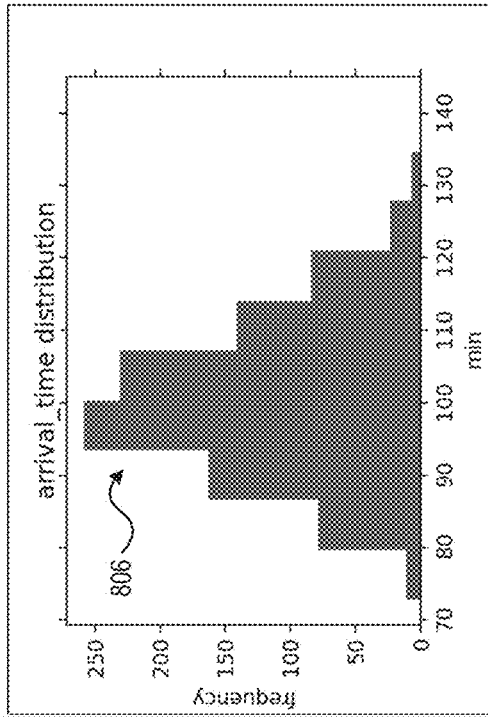
FIGS. 8A-8G show diagrams illustrating exemplary probability distributions obtained in accordance with aspects of the present disclosure.
Figure 8B:
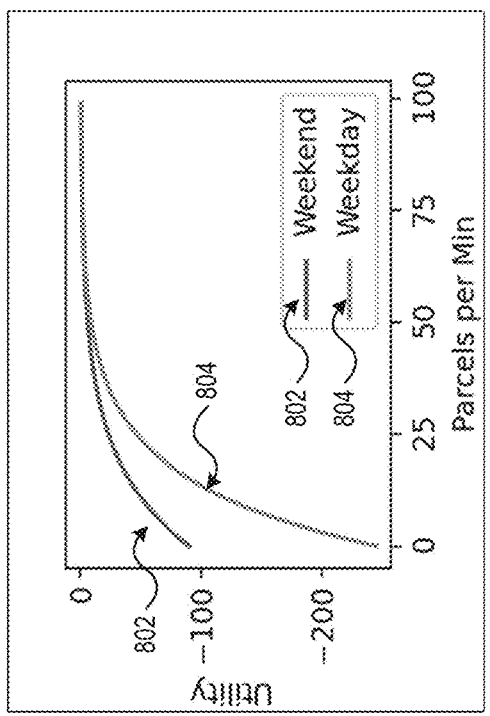
Figure 8C:
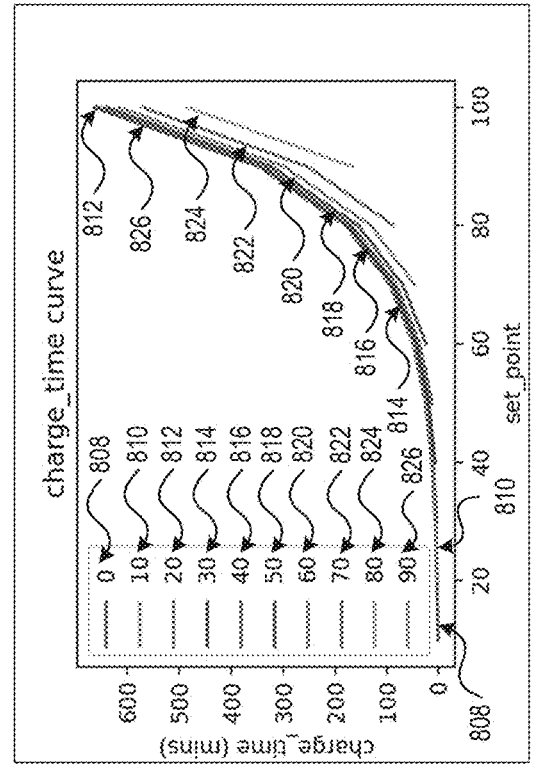

As described above with reference to FIGS. 1-3B, the joint distribution for the probabilistic graph models generated in accordance with the present disclosure may be known. As an example, and referring to FIGS. 8A-8C, diagrams illustrating exemplary probability distributions are shown. In particular, FIG. 8A shows the probability distribution for utility node 770, where plot 802 corresponds to the weekend and plot 804 corresponds to the weekday, and where throughput is represented on the x-axis and utility along the y-axis. In FIG. 8B, the probability distribution for the node 720 representing expected arrival time (in minutes) is shown by histogram 806. In FIG. 8C, the probability distribution for the edge 742 representing the statistical dependency between node 750 and the decision node 740 is shown and includes plots of charge time curves 808-826. As can be appreciated from FIG. 8C, the statistical dependency between the charge times and the set point (i.e., how long the robot spends charging its battery) configured by the decision node 740 can be seen by the fact that as the set point (x-axis) decreases, the charge time (y-axis) also decreases, and as the set point increases so too does the charge time.

Figure 8E:
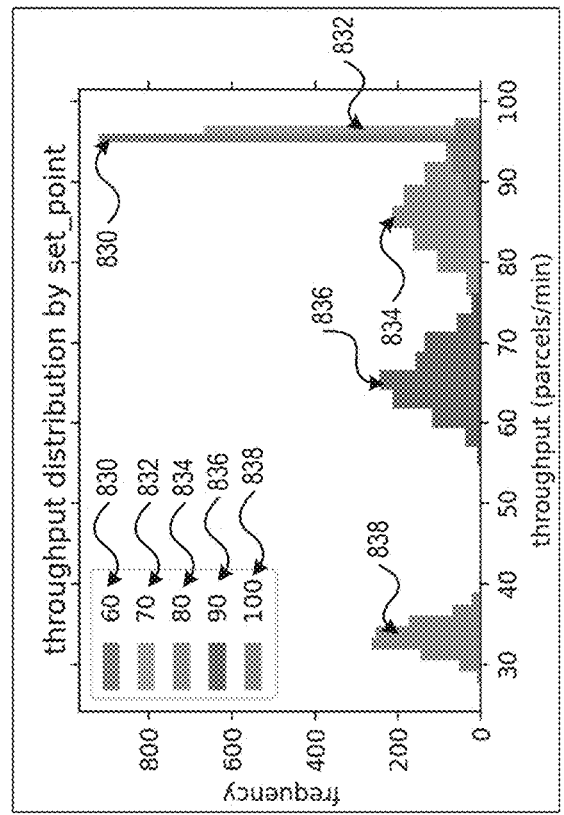
Figure 8D:
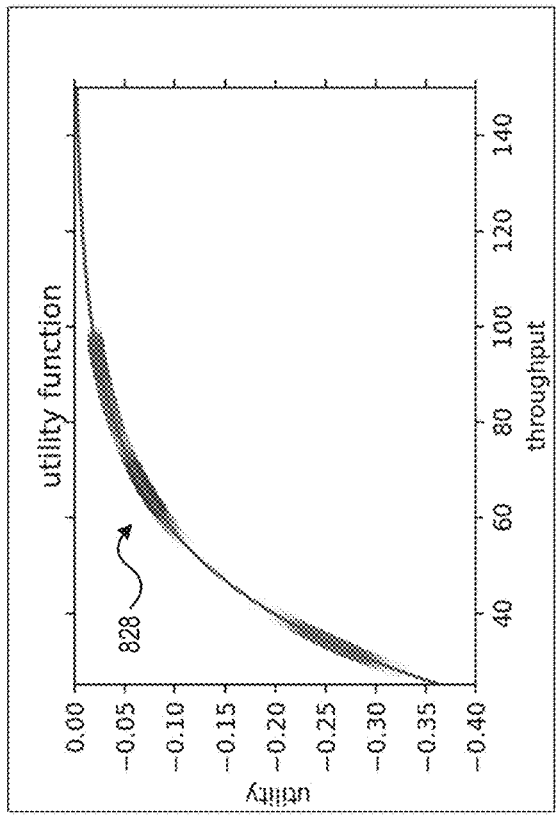
Figure 8F:
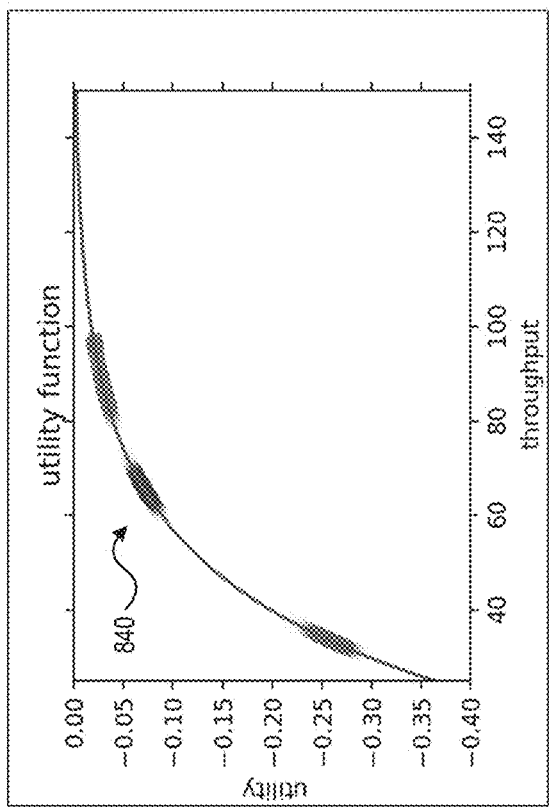
Figure 8G:
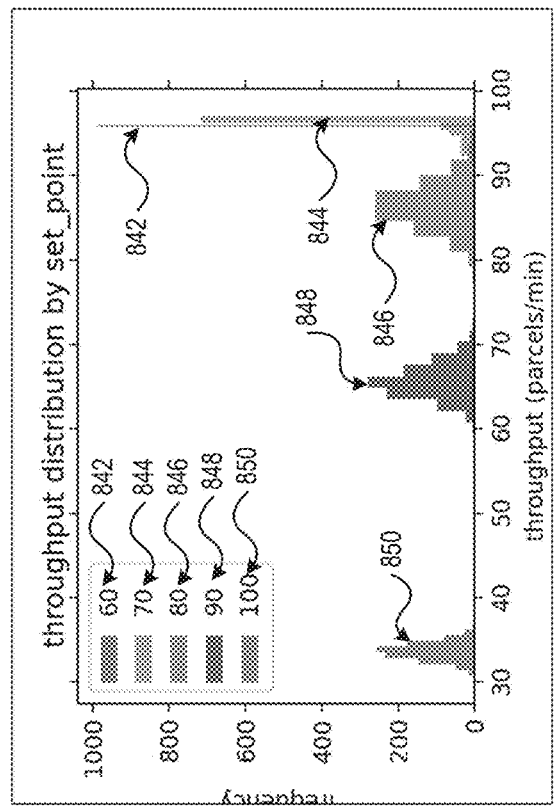

In FIGS. 8D-8G, probability distributions for throughput and the utility function are shown, where FIG. 8D includes a plot 828 of a probability distribution showing utility as a function of throughput, FIG. 8E shows histograms 830-838 representing probability distributions for throughput across a range of set point values, FIG. 8F includes a plot 840 of a probability distribution showing utility as a function of throughput, FIG. 8G shows histograms 842-850 representing probability distributions for throughput across a range of set point values. It is noted that the probability distributions shown in FIGS. 8D and 8E were generated under the assumption the arrival time (e.g., node 720) was ±40 minutes (high variability), while the probability distributions shown in FIGS. 8F and 8G were generated under the assumption arrival time (e.g., node 720) was ±20 minutes (low variability). Since the arrival time distribution used for FIGS. 8D and 8E has higher variability than the arrival time used for FIGS. 8F and 8G, the probabilistic graph model may consider the optimization of the high variability case (FIGS. 8D and 8E) to include more uncertainty as compared to the low variability case (FIGS. 8F and 8G) which included less uncertainty (e.g., because there was more variability in the past arrival times). The outputs of the expected utility for five different values of the set point are shown in Tables 1 and 2 below, which correspond to FIGS. 8F and 8D, respectively, demonstrate that the difference in variability due to the different arrival time parameters impacted the optimal set points (i.e., the set point with the highest expected utility). For example, Table 1 below shows the optimal set point for the low variability case (FIGS. 8F, 8G) was 70 minutes while Table 2 shows the optimal set point for the high variability case (FIGS. 8D, 8E) was 60 minutes, a more conservative solution given the higher levels of uncertainty around the arrival time.

TABLE 1

Expected Utility (EU); Low Variability

EU 60: −0.02069131926428976
EU 70: −0.020466693551385823
EU 80: −0.030720889284898047
EU 90: −0.07072122278709567
EU 100: −0.25804187691143965

TABLE 2

| EU; High Variability |
| --- |
| EU 60: −0.020889675394317436 |
| EU 70: −0.021609520599207968 |
| EU 80: −0.030856733839585294 |
| EU 90: −0.07022530269832856 |
| EU 100: −0.2589387886581521 |

It is noted that the exemplary optimization problem described and illustrated with reference to FIGS. 8A-8G has been provided for purposes of illustration, rather than by way of limitation and that probabilistic graph models in accordance with the present disclosure may be used to perform other types of optimizations using probabilistic graph models.

Figure 9A:
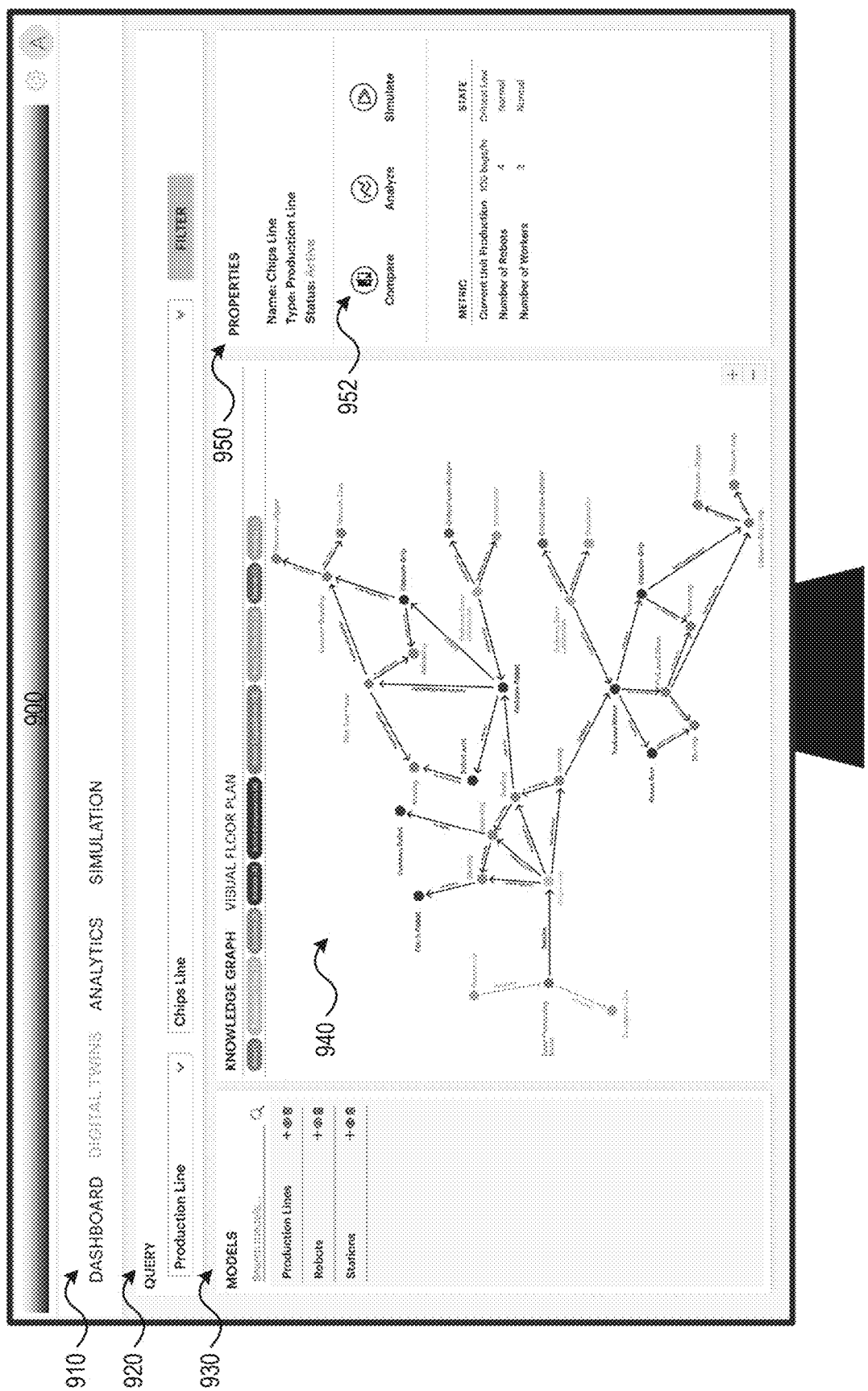
FIGS. 9A-9D illustrate exemplary aspects of a user interface for extracting information from digital twins in accordance with the present disclosure.
Figure 9B:
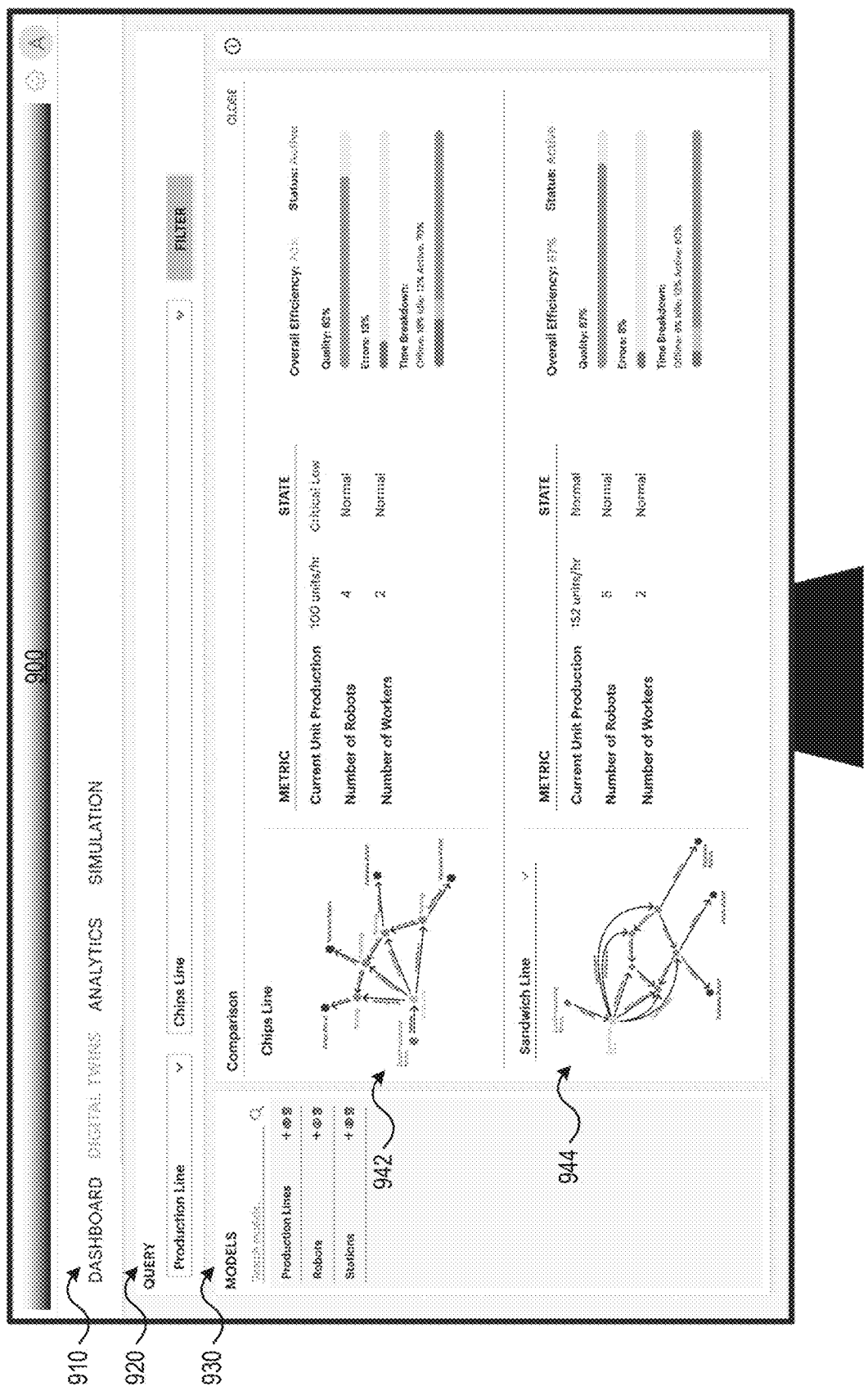

Referring to FIG. 9A, a screenshot of an exemplary user interface that may be utilized to create and interact with digital twins in accordance with the present disclosure is shown as a user interface 900. In an aspect, the user interface 900 may correspond to the GUIs 128 of FIG. 1 and may provide a user with access to the functionality provided by the data ingestion engine 120, the graphing engine 122, and the probabilistic modelling and optimization engine 124. In particular, the user interface 900 may provide users with a simple interface that enables the user to create digital twins in an intuitive manner with little technical knowledge or input.

As shown in FIG. 9A, the user interface 900 may include a plurality of selectable views 910, such as a Dashboard interface, a Digital Twins interface (shown in FIG. 9A), an Analytics interface, and a Simulation interface. The user interface 900 also provides a query builder 920 that enables the user to select a particular model or set of models, shown in FIG. 9A as a set of "Production Line" models, and a particular portion of the model(s) for the query, shown in FIG. 9A as "Chips Line." The user interface 900 also includes a model list 930 that identifies a model(s) available for viewing via the interface. Region 940 of user interface 900 enables the user to view a selected model as a knowledge graph (as shown in FIG. 9A) and may also enable other types of views to be displayed in the region 940, such as a floor plan view. User interface 900 includes a region 950 where information associated with a portion of the model may be displayed.

The region 950 may also enable the user to compare, analyze, and simulate portions of the model and view metric and state information for the model. For example, selection of the compare icon 952 may transition the user interface 900 to the view shown in FIG. 9B, which is a screenshot of an exemplary user interface that may be utilized to create and interact with digital twins in accordance with the present disclosure. In the view depicted in FIG. 9B, the region 940 has been updated to display information for two different models or portions of a same model. For example, at upper region 942 a portion of the knowledge graph shown in FIG. 9A associated with a "Chips Line" is shown (left), metric and state information is displayed (center), and efficiency and state information for the "Chips Line" is also shown (right). At lower region 944 a portion of the knowledge graph (or another knowledge graph) associated with a "Sandwich Line" is shown (left), metric and state information is displayed (center), and efficiency and state information for the "Sandwich Line" is also shown (right). The comparison view shown in FIG. 9B enables the user to quickly compare different knowledge graphs or portions thereof across a variety of data points and metrics (e.g., state, efficiency, and status and so on).

Figure 9C:
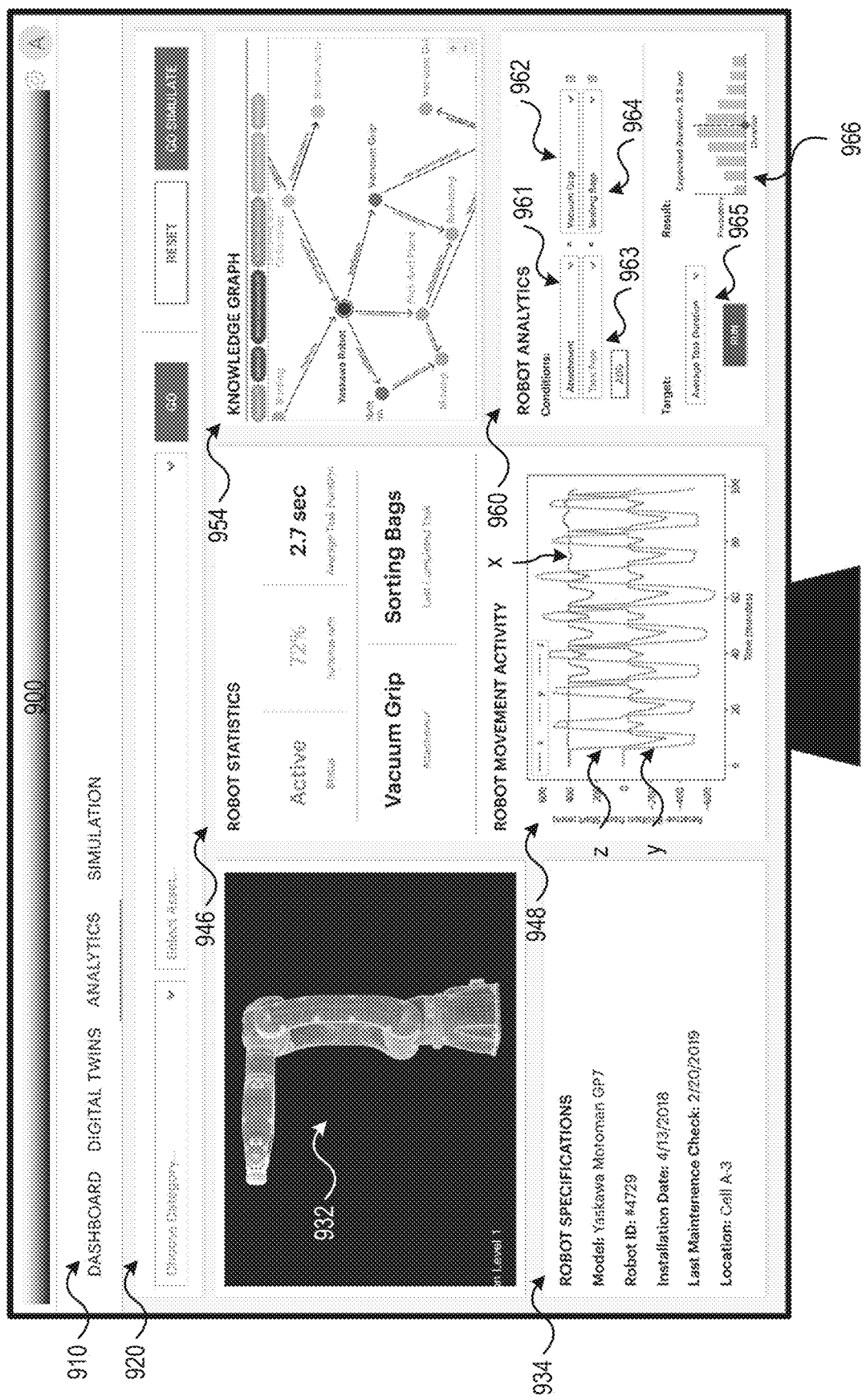

Referring to FIG. 9C, another screenshot of an exemplary user interface that may be utilized to create and interact with digital twins in accordance with the present disclosure is shown. The particular view of the user interface 900 shown FIG. 9C corresponds to the Analytics interface described above with reference to FIG. 9A and may be displayed in response to the user clicking on the "Analytics" tab in the region 910. In the Analytics view the user may view additional types of information associated with the domain represented by the digital twin. For example, an image of a portion of the domain may be displayed in region 932, shown in FIG. 9C as a robot. Region 934 may present specifications for the portion of the domain displayed in region 932. For example, in FIG. 9C the region 934 is displaying robot specifications for the robot shown in 932, where the specifications identify the robot's model, identifier (ID), installation date, last maintenance check, and location.

Region 946 displays statistics associated with the robot shown in region 932. For example, region 946 may display a current status of the robot, a success rate of the robot, an average task duration, a current attachment used by the robot, and a last completed task. Region 948 may display information associated with movement activity of the robot. For example, as shown in region 948 of FIG. 9C may display movement of the robot in 3 dimensions, each dimension represented by a different plot. As can be appreciated from FIG. 9C, displaying the 3D movement of the robot in this manner may enable a user to quickly detect if something is wrong. For example, the x, y, z plots appear to be following a pattern representative of the robot performing a repetitive task. If one or more of the plots became flat for a period of time (x-axis) or some other anomaly occurred, it may be easy for a user to detect that something may be wrong with the robot.

Region 954 may display a portion of the knowledge graph corresponding to the robot (or other relevant portion of the domain depicted in the region 932). Region 960 provides a query builder that enables the user to generate queries using a series of interactive elements. For example, dropdown menus 961, 962, 963, 964 enable the user to configure queries that may be run against a probabilistic graph model corresponding to the knowledge graph displayed in the region 954. As an example, dropdown menu 961 may enable the user to configure the robot, such as to select an attachment for the robot; dropdown menu 962 may enable the user to select a particular attachment for the robot from among a set of available attachments; dropdown 963 may enable the user to configure a test for the robot, such as selecting a task type to test for the robot; and dropdown 964 may enable the user to select a particular task from among a set of available tasks. The query builder may also enable the user to add additional features to the query and may specify a target for the query via dropdown menu 965. Once the query is configured, the user may activate an interactive elements (e.g., the run button below the dropdown menu 965) to execute the query against the probabilistic graph model. The distribution returned by the query may be displayed in the region 966. It is noted that the dropdown menus shown in the query builder of region 960 may be populated using information derived from the knowledge graph and/or a probabilistic graph model derived from the knowledge graph in accordance with the concepts disclosed herein. Moreover, while the interactive elements shown in region 960 include dropdown menus, it is to be understood that such elements have been provided for purposes of illustration, rather than by way of limitation and that other types of interactive elements and controls may be used to build queries in an intuitive manner using the concepts disclosed herein.

Figure 9D:
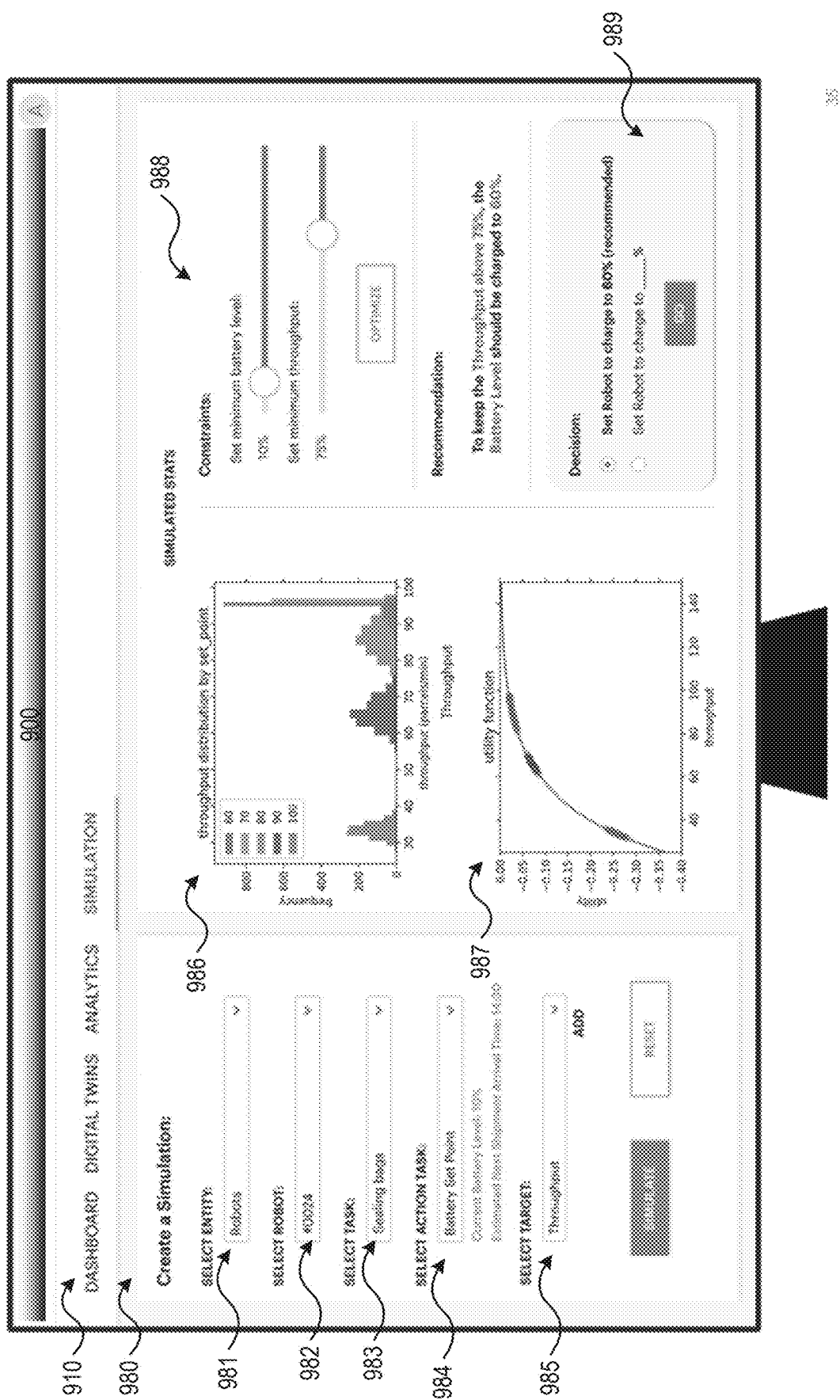

Referring to FIG. 9D, another screenshot of an exemplary user interface that may be utilized to create and interact with digital twins in accordance with the present disclosure is shown. The user interface view depicted in FIG. 9D may be the "Simulation" interface described above with reference to FIG. 9A and may be displayed in response to the user clicking on the "Simulation" tab in the region 910. The simulation interface enables the user to create simulations for execution against a probabilistic graph model generated in accordance with the present disclosure. As a non-limiting example, the simulation may correspond to the optimization problem described above with reference to FIGS. 7A-8G.

Similar to the region 960 of the "Analytics" interface of FIG. 9C, the "Simulation" interface may include a region 980 providing interactive elements that enable the user to configure a simulation. For example, the user may select an entity involved in the simulation using element 981, a particular instance of the entity (e.g., a particular robot) using element 982, a task using element 983, an action task (e.g., a set point or decision node) using element 984, and a target for the simulation using element 985. Once the various parameters of the simulation are configured, the user may activate another interactive elements (e.g., the "Simulate" button below the element 965) to begin the simulation. As explained above with reference to FIGS. 7A-7C, to perform simulations the probabilistic graph model may incorporate a decision node and a utility node. The decision node may be configured or identified via the element 984 and the utility node may be established based on the target selected (e.g., by the probabilistic modelling and optimization engine 124 of FIG. 1) via the element 985.

As described above with reference to FIGS. 7A-8G, the simulation may produce a set of probability distributions for the target based on all possible values of the decision node. The probabilities may be displayed within the "Simulation" interface, as shown at 986, 987. The "Simulation" interface may additionally provide interactive elements, shown in region 988, for imposing constraints on the simulation. For example, if the "Simulation" interface was used to configure the exemplary simulation described with reference to FIGS. 7A-8G, the constraints may include setting a minimum battery level and a minimum throughput. The constraints may be accounted for in the optimization engine. It is noted that the optimization may simply return the recommended set point determined to provide optimal performance in view of the constraints configured in the region 988. The recommended set point may be displayed in the region 989 with a set of selectable elements that enable the user to accept the recommended set point or modify the recommended set point. To optimize the entity, the user may activate the "accept recommended set point" control or modify the set point and the submit the set point by activating an element of the interface, such as the button at the bottom of the region 989. In an aspect, when the "Set Robot to charge to %" is selected, activating the submit control may cause a control signal to be sent to the real world counterpart to the robot to configure the robot's set point to the value configured using the control in the region 989.

As shown above with reference to FIGS. 9A-9D, the user interface 900, which may be provided as the one or more GUIs 128 of FIG. 1, enables users to create digital twin based on ontologies, knowledge graphs, and probabilistic graph models, and then leverage the query and simulation capabilities of the probabilistic graph models to infer various types of information associated with the digital twin in an intuitive manner that does not require the user to be a domain expert or have knowledge of the underlying computations and techniques. Additionally, the query builder and simulation generator facilitate rapid creation of analytics queries and simulations that provide meaningful insights about the digital twins. Moreover, by using an ontology driven approach construct knowledge graphs that may be exploited to produce probabilistic graph models, systems providing the functionality described herein may be utilized to create digital twins in a domain agnostic manner, that is to say, the system 100 of FIG. 1 and the features provided by the user interface 900 may be used to create digital twins for any domain.

Additionally, creating the knowledge graphs and probabilistic graph models in the manner described herein results in a tight coupling of the data and knowledge graph/probabilistic model, enabling analytics and simulations to be run from a single platform while providing the ability to express the data both deterministically and probabilistically. It is to be appreciated that the probabilistic querying capabilities provided by the probabilistic graph models extends knowledge graphs and enables development of complex ad-hoc condition probabilistic queries with uncertainty quantification. Such capabilities enable a more robust whatif analysis that extracts meaningful data from the probabilistic graph model and also enables automation of "optimal" decision-making, as described with reference to FIGS. 7A-8G. As shown above, systems operating in accordance with the concepts described and illustrated with reference to FIGS. 1-9D enable digital twins platforms to offer a robust set of tools for extending knowledge graphs and extracting meaningful data in a deterministic and probabilistic manner.

Figure 10:
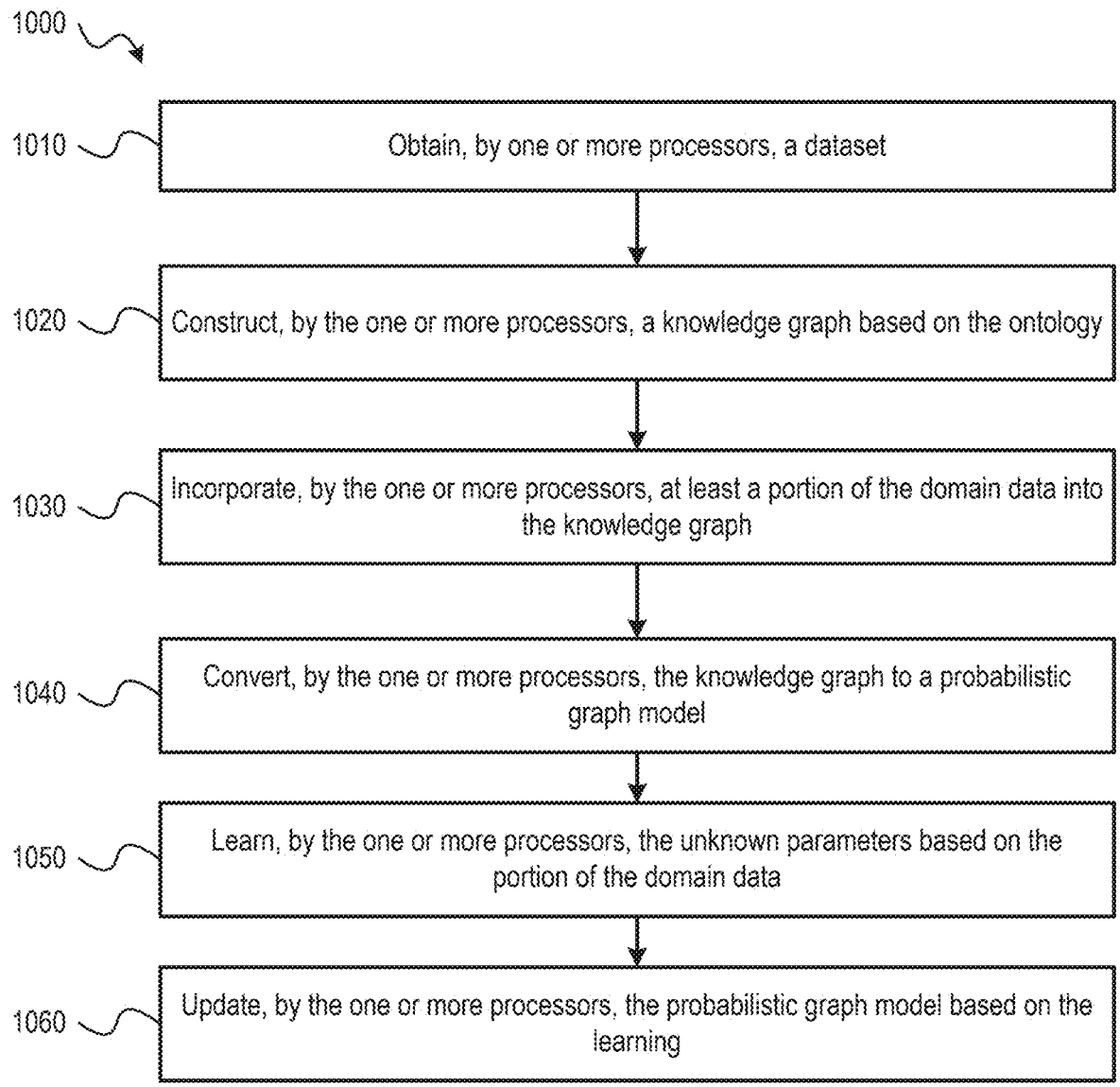
FIG. 10 is a flow diagram illustrating an example of a method for creating a digital twin according to one or more aspects of the present disclosure.

Referring to FIG. 10, a flow diagram of an example of a method for creating a digital twin according to one or more aspects is shown as a method 300. In some implementations, the operations of the method 300 may be stored as instructions that, when executed by one or more processors (e.g., the one or more processors of a computing device or a server), cause the one or more processors to perform the operations of the method 300. In some implementations, the method 300 may be performed by a computing device, such as the computing device 110 of FIG. 1 (e.g., a computing device configured for ad hoc execution of queries, optimization, and simulations), a cloud-based digital twins platform (e.g., cloud-based system 142 of FIG. 1), other devices, or a combination thereof.

The method 1000 demonstrates the process of creating the digital twin in accordance with the concepts described above with reference to FIGS. 1-9D. As shown in FIG. 10, the method 100 includes, at step 1010, obtaining, by one or more processors, a dataset. The dataset may be obtained using the data ingestion engine 120 of FIG. 1. The dataset includes an ontology and domain data corresponding to a domain associated with the ontology. For example, where the ontology is associated with a robot performing a task, the ontology may define the semantic relationships between the robot, task, duration, status, age, and manufacturer of the robot, as described above with reference to FIG. 2B. Similarly, the domain data may include data captured in connection with the robot performing tasks represented by the ontology. It is noted that the ontology and domain data described with reference to step 1010 have been provided for purposes of illustration, rather than by way of limitation and the method 1000 may be utilized with ontologies and domain data other than the specific example provided above.

At step 1020, the method 1000 includes constructing, by the one or more processors, a knowledge graph based on the ontology and at step 1030, incorporating, by the one or more processors, at least a portion of the domain data into the knowledge graph. The knowledge graph may be constructed from the ontology and the domain data using the graphing engine 122 of FIG. 1.

At step 1040, the method 1000 includes converting, by the one or more processors, the knowledge graph to a probabilistic graph model. As explained above with reference to FIGS. 1 and 3A, the probabilistic graph model may be generated by exploiting the structure of the knowledge graph to identify a set of random variables representing probability distributions, but those probability distributions may have unknown parameters. At step 1050, the method 1000 includes learning, by the one or more processors, the unknown parameters based on the portion of the domain data. As described above with reference to FIGS. 1, 3B, and 4, the unknown parameters may be learned using an iterative process driven by a generative program derived from the probabilistic graph model. During the iterative process, the unknown parameters may be estimated or guessed and data may be fed to the generative program to produce simulated data. The simulated data may be compared to real world data to determine whether the simulated data matches the real world data to within a threshold tolerance. When the simulated data matches the real world data to within a threshold tolerance, the guessed parameters may be deemed to sufficiently approximate the real parameters. As noted above, using approximated parameters may improve computation speed and reduce computational complexity with respect to learning the unknown parameters (e.g., as compared to Equation 3). At step 1060, the method 1000 includes updating, by the one or more processors, the probabilistic graph model based on the learning. As explained above with reference to FIGS. 1 and 3B, updating the probabilistic graph model to include the learned parameters may enable the joint distribution for probabilistic graph model to be obtained (e.g., based on Equation 1) based on the probability distributions for each of the random variables.

As described above, the method 1000 supports generation of probabilistic graph models in an ontology driven manner, thereby enabling the method 1000 to be applied across any domain, rather than being domain specific as in some presently available tools for developing digital twins. Additionally, by exploiting knowledge graphs having integrated domain data, the method 1000 is able to rapidly define the probabilistic graph model and its random variables and then learn the unknown parameters from the data directly without use of computational expensive computations, such as Equation 3. Additionally, the final probabilistic graph model extends the knowledge graph and enables the data of the knowledge graph to be expressed both deterministically and probabilistically, which enables the final probabilistic graph model to be queried using conditional probability queries with uncertainty quantification and automated "optimal" decision making. Furthermore, due to the tight coupling of the data and final probabilistic graph model, analytics may be obtained from the final probabilistic graph model itself, rather than requiring the data to be moved to another platform, as is required for some digital twins platforms.

It is noted that other types of devices and functionality may be provided according to aspects of the present disclosure and discussion of specific devices and functionality herein have been provided for purposes of illustration, rather than by way of limitation. It is noted that the operations of the method 1000 of FIG. 10 may be performed in any order.

It is also noted that the method 1000 of FIG. 10 may also include other functionality or operations consistent with the description of the operations of the system 100 of FIG. 1 and the examples shown and described with reference to FIGS. 2A-9D. For example, once the final probabilistic graph model is obtained, a query may be defined and ran against the final probabilistic graph model. The query may return a probability distribution derived from the probability distributions of the final probabilistic graph model. Additionally, the method 1000 may be used to perform automated "optimal" decision making, as described above with reference to FIGS. 7A-8G. As noted with reference to FIG. 9D, during automated "optimal" decision making in accordance with the present disclosure, the user may only need to input a target for the optimization and a set point while the utility node may be established automatically. Furthermore, the user may be enabled to configure constraints for the automated "optimal" decision making process and selectively implement, modify, or ignore a recommendation resulting from the optimization analysis.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-10) include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may also be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

What is claimed is:

1. A method for creating digital twins, the method comprising:
    obtaining, by one or more processors, a dataset, wherein the dataset comprises an ontology and domain data corresponding to a domain associated with the ontology;
    constructing, by the one or more processors, a knowledge graph based on the ontology;
    incorporating, by the one or more processors, at least a portion of the domain data into the knowledge graph; and
    converting, by the one or more processors, the knowledge graph to a probabilistic graph model,
        wherein the probabilistic graph model represents a digital twin of a real world counterpart, wherein the real world counterpart comprises a robot that is used to unload trucks arriving at a loading dock,
        wherein the probabilistic graph model comprises a plurality of nodes and edges connecting at least some of the plurality of nodes to one or more other nodes,
        wherein the probabilistic graph model comprises probability distributions having unknown parameters associated with the plurality of nodes, and
        wherein the plurality of nodes include a node associated with a battery level percentage of the robot, a node associated with a set point indicating the battery level percentage at which the robot stops charging, a node associated with the amount of time the robot needs to charge to the set point and a node associated with a throughput specifying how many items per minute the robot can unload from the trucks;
    learning, by the one or more processors, the unknown parameters based on the portion of the domain data; and
    updating, by the one or more processors, the probabilistic graph model based on the learning, wherein the updating:
        replaces the unknown parameters with parameters obtained via the learning, and
        includes obtaining a joint probability distribution of the probabilistic graph model;
    generating a query associated with at least one random variable associated with the probability distributions of the probabilistic graph model using the joint probability distribution of the probabilistic graph model;
    running the query against the probabilistic graph model to obtain a query result, wherein the query result comprises a distribution associated with the at least one random variable;
    generating a control signal based on the query result, wherein the control signal specifies the battery level percentage for the set point to optimize the throughput of the robot; and
    transmitting the control signal to the robot for optimal operation.

2. The method of claim 1, further comprising:
    generating a generative program based on the probabilistic graph model; and
    generating a set of guessed parameters corresponding to the unknown parameters,
    wherein the learning comprises:
        feeding a set of data and the set of guessed parameters to the generative program to produce simulation data; and
        determining whether the simulation data approximates a set of real data to within a threshold tolerance, wherein the probabilistic graph model is updated to include the parameters obtained via the learning when the simulation data approximates the set of real data to within the threshold tolerance, and wherein the parameters obtained via the learning correspond to the set of guessed parameters.

3. The method of claim 2, further comprising:
    modifying the set of guessed parameters in response to a determination that the simulation data does not approximate the set of real data to within the threshold tolerance; and
    iteratively performing the feeding, the determining, and the modifying until the simulation data approximates the set of real data to within the threshold tolerance.

4. The method of claim 2, wherein the generative program comprises deterministic statements and probabilistic statements corresponding to the probability distributions.

5. The method of claim 1, further comprising exploiting the knowledge graph to obtain random variables, each of the random variables corresponding to one of the probability distributions.

6. The method of claim 5, further comprising obtaining the joint probability distribution of the probabilistic graph model based on the probability distributions for each of the random variables.

7. The method of claim 6, further comprising:
    detecting a missing value in the domain data; and
    updating the domain data to include a value for the missing value based on a probability distribution corresponding to the missing value derived from known values associated with the missing value.

8. The method of claim 1, wherein the knowledge graph represents semantic relationships and the probabilistic graph model represents statistical dependencies.

9. A system for creating digital twins, the system comprising:
a memory; and
one or more processors communicatively coupled to the memory, the one or more processors configured to:
obtain a dataset, wherein the dataset comprises an ontology and domain data corresponding to a domain associated with the ontology;
construct a knowledge graph based on the ontology;
incorporate at least a portion of the domain data into the knowledge graph;
convert the knowledge graph to a probabilistic graph model,
wherein the probabilistic graph model represents a digital twin of a real world counterpart, wherein the real world counterpart comprises a robot that is used to unload trucks arriving at a loading dock,
wherein the probabilistic graph model comprises a plurality of nodes and edges connecting at least some of the plurality of nodes to one or more other nodes,
wherein the probabilistic graph model comprises probability distributions having unknown parameters associated with the plurality of nodes, and
wherein the plurality of nodes include a node associated with a battery level percentage of the robot, a node associated with a set point indicating the battery level percentage at which the robot stops charging, a node associated with the amount of time the robot needs to charge to the set point and a node associated with a throughput specifying how many items per minute the robot can unload from the trucks;
learn the unknown parameters based on the portion of the domain data; and
update the probabilistic graph model based on the learning, wherein the unknown parameters are replaced with parameters obtained via the learning via the update, and wherein the update includes obtaining a joint probability distribution of the probabilistic graph model;
generate a query associated with at least one random variable associated with the probability distributions of the probabilistic graph model using the joint probability distribution of the probabilistic graph model;
run the query against the probabilistic graph model to obtain a query result, wherein the query result comprises a distribution associated with the at least one random variable;
generate a control signal based on the query result, wherein the control signal specifies the battery level percentage for the set point to optimize the throughput of the robot; and
transmit the control signal to the robot for optimal operation.

10. The system of claim 9, the one or more processors configured to:
provide a graphical user interface providing query building functionality;
receive inputs associated with random variables of the probabilistic graph model, each of the random variables corresponding to one of the probability distributions; and
generate a query based on the received inputs.

11. The system of claim 10, wherein the query comprises a conditional probabilistic query regarding values of one or more of the random variables with uncertainty quantification.

12. The system of claim 9, wherein the probability distributions correspond to random variables, and wherein each of the random variables corresponds a node of the plurality of nodes or one of the edges.

13. The system of claim 9, wherein updating the probabilistic graph model comprises embedding the probability distributions into the probabilistic graph model.

14. A non-transitory computer-readable storage medium storing instructions that, when executed by one or more processors, cause the one or more processors to perform operations for generating probabilistic graph models, the operations comprising:
obtaining a dataset, wherein the dataset comprises an ontology and domain data corresponding to a domain associated with the ontology;
constructing a knowledge graph based on the ontology;
incorporating at least a portion of the domain data into the knowledge graph; and
converting the knowledge graph to a probabilistic graph model,
wherein the probabilistic graph model represents a digital twin of a real world counterpart, wherein the real world counterpart comprises a robot that is used to unload trucks arriving at a loading dock,
wherein the probabilistic graph model comprises a plurality of nodes and edges connecting at least some of the plurality of nodes to one or more other nodes,
wherein the probabilistic graph model comprises probability distributions having unknown parameters associated with the plurality of nodes, and
wherein the plurality of nodes include a node associated with a battery level percentage of the robot, a node associated with a set point indicating the battery level percentage at which the robot stops charging, a node associated with the amount of time the robot needs to charge to the set point and a node associated with a throughput specifying how many items per minute the robot can unload from the trucks;
learning the unknown parameters based on the portion of the domain data; and
updating the probabilistic graph model based on the learning, wherein the updating:
replaces the unknown parameters with parameters obtained via the learning, and
includes obtaining a joint probability distribution of the probabilistic graph model;
generating a query associated with at least one random variable associated with the probability distributions of the probabilistic graph model using the joint probability distribution of the probabilistic graph model;
running the query against the probabilistic graph model to obtain a query result, wherein the query result comprises a distribution associated with the at least one random variable;
generating a control signal based on the query result, wherein the control signal specifies the battery level percentage for the set point to optimize the throughput of the robot; and
transmitting the control signal to the robot for optimal operation.

15. The non-transitory computer-readable storage medium of claim 14, the operations further comprising:
  obtaining additional domain data; and
  performing additional learning based on the additional domain data.

16. The non-transitory computer-readable storage medium of claim 15, the operations further comprising modifying at least one parameter obtained via the learning based on at least one parameter obtained via the additional learning.

17. The method of claim 1, wherein the ontology specifies distribution types of one or more of the probability distributions configured based on expected or known characteristics of the probability distributions.

18. The system of claim 9, wherein the ontology specifies distribution types of one or more of the probability distributions configured based on expected or known characteristics of the probability distributions.

19. The non-transitory computer-readable storage medium of claim 15, wherein the ontology specifies distribution types of one or more of the probability distributions configured based on expected or known characteristics of the probability distributions.

* * * * *